United States Patent
Miseiko

(10) Patent No.: US 12,206,700 B1
(45) Date of Patent: Jan. 21, 2025

(54) ASYNCHRONOUS PROTOCOL FOR ASSESSMENT OF NETWORK SYSTEM ASSETS

(71) Applicant: Rapid7, Inc., Boston, MA (US)

(72) Inventor: Paul Miseiko, Mississauga (CA)

(73) Assignee: Rapid7, Inc., Boston, MA (US)

( * ) Notice: Subject to any disclaimer, the term of this patent is extended or adjusted under 35 U.S.C. 154(b) by 214 days.

(21) Appl. No.: 17/978,368

(22) Filed: Nov. 1, 2022

(51) Int. Cl.
*H04L 9/40* (2022.01)

(52) U.S. Cl.
CPC .................. *H04L 63/1433* (2013.01)

(58) Field of Classification Search
None
See application file for complete search history.

(56) References Cited

U.S. PATENT DOCUMENTS

| | | | |
|---|---|---|---|
| 7,609,650 B2 | 10/2009 | Roskowski et al. | |
| 8,955,038 B2 | 2/2015 | Nicodemus et al. | |
| 9,503,472 B2 | 11/2016 | Laidlaw et al. | |
| 9,634,951 B1 | 4/2017 | Hunt et al. | |
| 9,954,883 B2 | 4/2018 | Ahuja et al. | |
| 2004/0260882 A1* | 12/2004 | Martinez | G06F 12/0866 711/E12.019 |
| 2007/0004406 A1* | 1/2007 | Jaakkola | H04W 52/0258 455/434 |
| 2012/0174225 A1* | 7/2012 | Shyamsunder | G06F 21/56 726/24 |
| 2016/0044057 A1 | 2/2016 | Chenette et al. | |
| 2017/0230513 A1* | 8/2017 | Nagaraj | H04L 61/50 |
| 2020/0236117 A1* | 7/2020 | Zingerman | H04L 63/0245 |
| 2020/0351298 A1* | 11/2020 | Paturi | H04L 67/535 |
| 2021/0314342 A1* | 10/2021 | Oberg | H04L 63/20 |

* cited by examiner

*Primary Examiner* — Raqiul A Choudhury
(74) *Attorney, Agent, or Firm* — Ashwin Anand; Lei Sun

(57) ABSTRACT

A method for authenticated asset assessment is provided. The method includes authenticating, by a scan assistant, a scan engine with the scan assistant for executing one or more scan operations on the asset to determine a state of the asset. The asset includes at least one computing resource. The method also includes receiving, by the scan assistant, a plurality of scan requests associated with the one or more scan operations from the scan engine. The method further includes responding, by the scan assistant, to at least one scan request of the plurality of scan requests by transmitting one or more scan responses to the scan engine after receiving the plurality of scan requests. The scan assistant and the scan engine implement an asynchronous communication protocol that permits the scan engine to send the scan requests without waiting for scan responses for previous scan requests.

20 Claims, 12 Drawing Sheets

ASYNCHRONOUS PROTOCOL FOR ASSESSMENT OF NETWORK SYSTEM ASSETS

TECHNICAL FIELD

This disclosure is related to network computing systems. In particular, this disclosure is related to assessing assets of a network computing system.

BACKGROUND

Authenticated scans provide insight into the state of an asset on a network system. These scans may require an owner of the network to create, manage, and distribute credentials in order to implement and use these scans. This may create network challenges and may often require integration with third-party credential services. For example, authenticated scan credentials may require administrative (e.g., WINDOWS®)/root (e.g., UNIX®) access to effectively authenticate a scan and thereby complicate acceptance to deploy credentials.

In some aspects scan performance may be directly related to the latency between the scan engine and the asset being scanned. This relationship may be due to the round trip time required for each request the scan engine makes. An assessment of an asset may result in hundreds or thousands of requests and since each request is synchronous and contingent on the response of prior requests performance decreases as latency increases. In addition, scan engines may have to provide scan requests to an asset each time the scan engine performs a scan on the asset resulting in lost scan performance and increased latency.

SUMMARY OF EMBODIMENTS

Disclosed herein are methods, systems, and apparatuses for implementing authenticated assessment of a network system asset. Embodiments described herein utilize a scan assistant implemented with an asset of a network system to authenticate a scan engine for performing a scan assessment of the asset. The scan assistant may allow network system owners to authenticate a scan engine on a device without using credentials from third-party credential management software and bypassing network system owner concerns when creating an administrative level credential or a root level credential for remote access. In some aspects, an asynchronous API used by a scan engine to assess an asset to decrease scan latency and improve scan performance. Additionally, or alternatively, the scan assistant may store previous scan requests made during a previous scan to more quickly access those same scan requests for a subsequent scan on an asset to decrease scan latency and improve scan performance.

Figure 1:
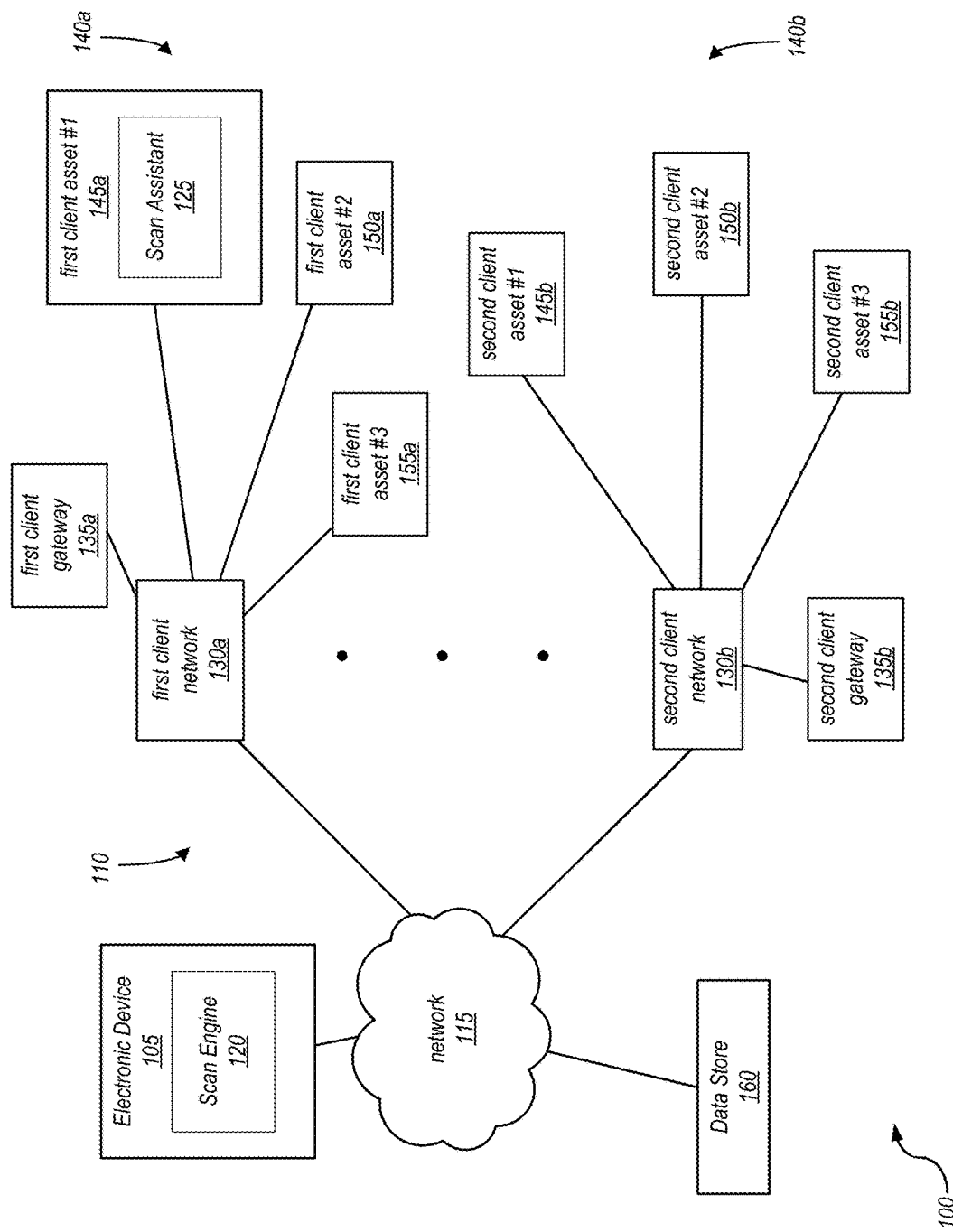
FIG. 1 illustrates an example scan engine and a client asset according to some aspects.

While the disclosure is open to various modifications and alternative implementations, specific embodiments of the disclosure are provided as examples in the drawings and detailed description. It should be understood that the drawings and detailed description are not intended to limit the disclosure to the particular form disclosed.

DETAILED DESCRIPTION

Authenticated scans provide insight into the state of an asset on a network system. These scans may require an owner of the network to create, manage, and distribute credentials in order to implement and use these scans. This may create network challenges and may often require integration with third-party credential services. For example, authenticated scan credentials may require administrative (e.g., WINDOWS®)/root (e.g., UNIX®) access to effectively authenticate a scan and thereby complicate acceptance to deploy credentials.

In some aspects, remote execution of commands on an asset of a network system to perform assessment of that asset may require authentication of a remote device. WinRM® on WINDOWS®, OpenSSH® on UNIX®, and similar systems may be used to achieve remote access. However, if a credential used by a remote device for authenticated access becomes compromised, the credential may be used to provide or obtain unfettered access to the asset.

In some aspects, scan performance may be directly related to the latency between the scan engine and the asset being scanned. This relationship may be due to a round trip time needed for each request the scan engine makes. The assessment of an asset may result in hundreds or thousands of requests and since each request is synchronous and contingent on the response of prior requests performance decreases as latency increases. As described herein, an asynchronous protocol that supports any number of concurrent requests and tags those requests with an identifier such that the client (scan engine) may identify which request a response is for when it receives that response. This may allow the scan engine to bypass the penalty associated with increasing latency and may allow scan performance to remain about the same across a wide range of latency values.

In some aspects, a single connection capable of servicing multiple questions in parallel (e.g., an asynchronous API) may be provided. Scan engines may often use a synchronous protocol when assessing an asset (e.g., OpenSSH® command/response). Multiple connections to an asset may be created to simulate an asynchronous protocol by allowing multiple threads to assess the asset in parallel via each of the connections made. However, this case may not often scale well. This case may also impose additional resource requirements on networks the scan engine is to traverse to communicate with the asset, may use additional resources on the asset itself, and may use additional resources on the scan engine. These increased resource uses may slow the overall scan or may have a negative effect on network hardware (e.g., crash, performance issues, or a denial of service type experience). An asynchronous protocol servicing all the questions an authenticated scan might ask an asset and the scan engine may only need a single connection and may not cause any of the aforementioned issues a customer might experience with a multi connection approach.

In some aspects, for example, after implementing an asynchronous protocol for remote authenticated assessment of an asset for full utilization, the scan engine may remember all the queries it made against each asset it scanned such that when the scan engine scans the same asset in a future scan it can issue requests for all the data the previous scan collected utilizing the asynchronous nature of the protocol. Doing so may improve scan performance or at least reduce the effect latency has on scan performance. These concepts may only improve future scan performance (the asset must first be scanned to prime the knowledge about what data needs to be collected). The history of queries may be updated with each scan removing questions that are no longer asked and adding new questions.

As described herein, a process in which historic queries (questions) are stored on a per asset basis may be provided. The process may include that historic queries (questions) are updated with each scan. The process may also include that if an asynchronous protocol is available all those questions can be asked in parallel to improve scan performance and/or reduce the effect latency has on a scan. If multiple connections are made (a non-asynchronous protocol) questions can be asked in parallel relative to the number of connections made to improve scan performance and/or reduce the effect latency has on a scan.

In some aspects, a scan engine may track what it collected against a given asset and may store what resources it collected per asset in a database or flat file. Future scans may then recollect the same resources by sending requests for all the resources stored in the database or flat file at the same time. Thus, data may be asynchronously collected so that, for example, the scan engine may not wait for responses while making requests. Also, data may be asynchronously collected relative to the scan of that asset so that, for example, data is collected before the scan needs it in preparation for the scan potentially needing it. This may result in a considerable overall performance improvement for authenticated scans across all amounts of network latency. In some aspects, authenticated scans of an asset may take almost the same amount of time to complete regardless of the network latency between the scan engine and the asset, normalizing scan performance across all amounts of network latency. This may also create new and exciting options for providing scan services to customers such as hosted scan engines in a platform that can scan corporate networks with appropriate precautions and configurations.

FIG. 1 illustrates an example network computing system 100 according to some aspects. The network computing system 100 may be for performing scans of one or more assets. As shown in FIG. 1, the network computing system 100 may include an electronic device 105 in electronic communication with one or more client networks 110 via the network 115. The electronic device 105 may include a scan engine 120 for performing one or more scan operations of an asset of a client network. In some aspects, the one or more client networks 110 may include at least a first client network 130a and a second client network 130b. The first client network 130a may include a first client gateway 135a controlling electronic communication traffic into and out of the first client network 130a. The first client network 130a may also include one or more first customer assets 140a. For example, the one or more first customer assets 140a may include a first customer asset #1 145a, a first customer asset #2 150a, and a first customer asset #3 155a. Similarly, the second client network 130b may include a second client gateway 135b controlling electronic communication traffic into and out of the second client network 130b. The second client network 130b may also include one or more second customer assets 140b. For example, the one or more second customer assets 140b may include a second customer asset #1 145b, a second customer asset #2 150b, and a second customer asset #3 155b.

The network computing system 100 may also include a data store 160 in electronic communication with the electronic device 105 and with the one or more client networks 110 via the network 115. The data store 160 may store metadata (e.g., scan responses) associated with an asset and obtained by the scan engine 120 and via the scan assistant 125 to perform one or more scan operations as described further herein. The data store 160 may store metadata (e.g., scan responses) from a previous one or more scan operations on an asset to execute a subsequent one or more scan operations on the asset, as described herein.

For at least the first client network 130a of the one or more client networks 110, at least the first customer asset #1 145a may include a scan assistant 125. The scan assistant 125 may shift the challenge from credentials to software and advance the perception that software management is easier for customers from both a technical and psychological perspective. The scan assistant 125 may function on each asset and answer questions of an authenticated scan without the need to create, manage, or distribute credentials. The scan assistant 125 may provide encrypted communication with modern authentication which is an improvement on some assets. In some cases, the scan assistant may provide an asynchronous API that enables simultaneous inflight questions.

In some embodiments, the scan assistant 125 may execute as a service on the asset. The scan assistant 125 communicates with the scan engine 120 using a communication protocol that is designed and optimized to allow the scan engine to instruct the scan assistant to perform a scan of the asset. In some embodiments, the communication protocol enables the scan assistant to receive scan operations from the scan engine and return results of the scan operations to the scan engine to report a state of the asset. For example, the scan engine 125 may use the communication protocol to request certain data stored on the asset (e.g. event logs, file data, or registry data) or query for information about the asset (e.g. current CPU or memory usage metrics). In some embodiments, the scan engine 125 may instruct the scan assistant to execute a number of commands on the asset, for example, to collect and compile information about the asset to be reported to the scan engine.

In some aspects, the scan assistant 125 may use the Transport Layer Security (TLS) protocol to establish a TLS connection with the scan engine 120. For example, a TLSv1.2 or TLSv1.3 connection with one- or two-way client certificate authentication may be used to encrypt communication traffic between the scan assistant and the scan engine. Depending on the situation or embodiment, either the scan assistant or the scan engine can send the initial connection request to establish the TLS connection. In some embodiments, when the connection is established, the scan assistant 125 may receive a public certificate from the scan engine 120 and use the certificate to verify the identity of the scan engine, so as to authenticate the scan engine to perform scan operations on the asset. For example, the scan assistant may hold a public certificate (which may be seen as a certificate authority) that can be used to verify the public certificate received from the scan engine is authorized to use the scan assistant. As another example, the scan assistant may hold a public certificate (which may be seen as a certificate authority) that can be used to verify that the public certificate received from the scan engine was signed with a matching private key of the public certificate (or certificate authority) held by the scan assistant. The public certificate held by the scan assistant may be a self-signed public certificate signed by a private key held by the scan engine, or a certificate authority whose private key was used to sign the public certificate held by the scan engine. The public certificate (or certificate authority) held by the scan assistant may be stored with the scan assistant (e.g. as part of the installation package of the scan assistant), and/or pulled (e.g. retrieved) from a remote location (e.g. based on a periodic rotation schedule), and/or pushed (e.g. received) from a remote location (e.g. based on a periodic rotation schedule).

In some embodiments, the scan engine 120 may receive a second certificate from the scan assistant 125 as part of the TLS connection establishment process, which may be used to authenticate the identity of the scan assistant. However, in some embodiments, the scan engine may not use the second certificate to verify the identity of the scan assistant 125. This one-way verification process is used because in some embodiments, the scan engine will not have the authentication information of the scan assistant (e.g. the scan assistant's public certificate or a certificate authority that can verify the scan assistant's public certificate) before the connection (e.g. in embodiments where the scan assistant regenerates its certificate upon asset reboots). However, the one-way verification scheme is sufficient in this context because the scan engine is not providing sensitive information to the scan assistant, and so it is not critical for the scan assistant to establish trust to the scan engine.

The scan assistant may perform authentication schemes and/or authenticate with a scan engine. The scan engine 120 may authenticate with a scan assistant 125 using a variety of different authentication methods so that the scan assistant 125 may verify the entity scanning it and determine whether the entity scanning it is authorized (e.g., an authorized scan engine), or a yet to be built authorized client that is not a scan engine. The connecting client must authorize itself via some form of authentication. The scan assistant 125 may verify a scan engine certificate. In other words, the scan assistant 125 described herein may utilize 2-way client certificate authentication with a reversed one-way methodology. The scan engine 120 may have access to the private key associated with the public certificate, while the scan assistant 125 may be deployed with the public key associated with the public certificate (also known as a client certificate). The scan assistant 125 may be deployed with the public key, or with the client certificate itself. In some aspects, a client certificate and a public key may be fundamental equals such that a client certificate is a x509 container that includes the public key. In some cases, a x509 container may not be necessary. In some aspects, the x509 client certificate can be signed by the private key associated with the same public key in the x509 client certificate, known as a self-signed public certificate. In some aspects, the x509 client certificate can be signed by a private key associated with a certificate authority. This situation may solve a critical problem when private material is used and the client should not know the secret material required to access other clients (e.g. a client, such as the scan engine, must have the private key associated with an authorized public key to authenticate with the scan assistant).

Furthermore, scan assistant 125 may utilize a pure binary protocol, a pure HTTP protocol with text based content encapsulation such as Json or XML, and a hybrid HTTP protocol with binary based content encapsulation. A pure binary protocol may be about five times more efficient (reduced CPU load) on the scan target over the HTTP protocol when the equivalent of a zero resistance load was applied to the system (a request with no functional handler). This allowed the scan assistant 125 to service 250,000 requests per second with the binary protocol versus 50,000 requests per second with the HTTP protocol. However, in real-world scenarios, the scan assistant 125 spends most of its time in the handler of a request and in real-world tests the pure binary protocol was about two times more efficient. A conclusion may be to use the HTTP protocol with a hybrid binary based content encapsulation. The HTTP protocol may be easier to understand and maintain versus a binary protocol, and the long term engineering costs of a pure binary protocol may not merit the additional efficiencies it offers. To avoid complications with different encoding schemes and internationalization, a binary based content encapsulation may be used where data on the scan assistant is serialized into bytes and the client must decode those bytes into the appropriate encoding scheme. The HTTP protocol may maintain communication channel integrity with a combination of the "Content-Length" field when responses are small, and "Chunked Transfer Encoding" when the response is large. This may keep the protocol from being desynchronized between the client and server, as may happen with some pure binary protocols, while maintaining a very small memory footprint when moving large amounts of data e.g., when the client requests to read a large file.

The network computing system 100 may also include an external device 160 in electronic communication with the electronic device 105 and with the one or more client networks 110 via the network 115. The external device 160 may coordinate with the scan engine 120 and the scan assistant to perform scan assistant signed command execution as described further herein. In some aspects, the external device 160 may be outside a customer environment such that a customer and an entity associated with the external device 160 may both need to be compromised to completely compromise the scan assistant 125.

Figure 2:
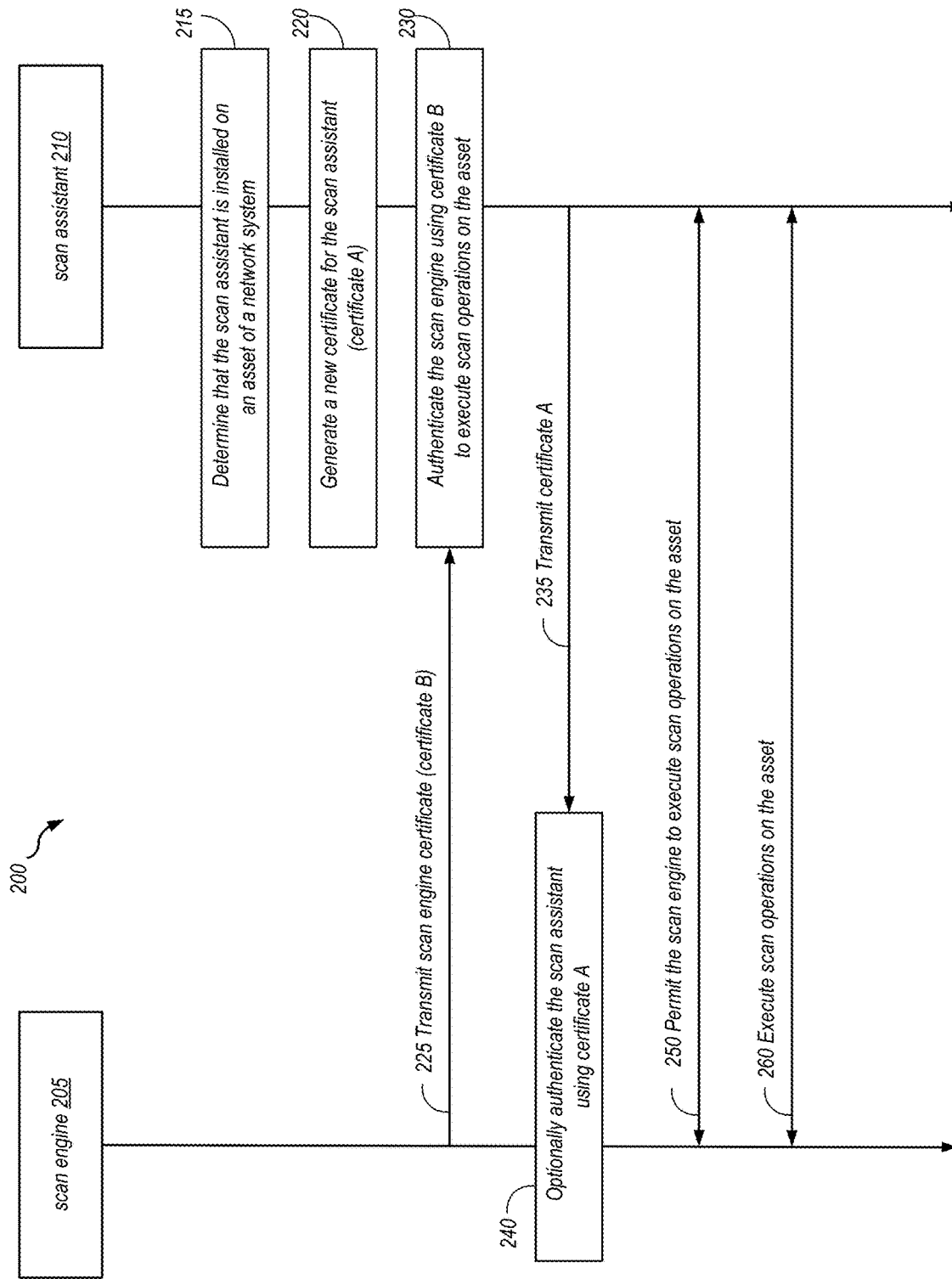
FIG. 2 illustrates an example system for performing asset assessment on an asset according to some aspects.

FIG. 2 illustrates an example system 200 for performing asset assessment on an asset according to some aspects. The example system 200 may include a scan engine 205 and a scan assistant 210. The scan engine 205 may be the same as or at least similar to the scan engine 120 illustrated in FIG. 1. For example, the scan engine 205 may be located on an electronic device as described herein. The scan assistant 210 may be the same as or at least similar to the scan assistant 125 illustrated in FIG. 1. For example, the scan assistant 210 may be for installation on an asset such as a customer asset as described herein.

At operation 215, the scan assistant 210 may determine that the scan assistant 210 is installed on an asset of a network system. For example, the scan assistant 210 may determine that the scan assistant 210 is installed on an asset of a network system in response to installing the scan assistant 210 on the asset of the network system. As another example, the scan assistant 210 may determine that the scan assistant 210 is installed on an asset of a network system when the asset of the network system is powered on or activated for operation.

At operation 220, the scan assistant 210 may generate a new private key and public certificate (certificate A) pair for establishing a TLS connection with the scan engine 205 to execute one or more scan operations on the asset for determining a state of the asset. The asset may include at least one computing resource. For example, the scan assistant 210 may generate the new private key and public certificate pair after (e.g., in response to) receiving the indication that the scan assistant 210 is installed or upgraded on the asset of the network system. As another example, the scan assistant 210 may generate the new private key and public certificate pair after (e.g., in response to) a reboot of the asset, restarting the scan assistant service on the asset, or receiving a public certificate from the scan engine 205 as described further herein. In some embodiments, a private key and public certificate (certificate A) may be installed with the scan assistant 210 (and/or as a component of the scan assistant) when the scan assistant 210 is installed on the asset and the private key and public certificate pair may be stored in a secure storage area in a memory of the asset for use by the scan assistant 210 as described herein. In some embodiments, the public certificate installed with the scan assistant 210 (and/or as a component of the scan assistant) might be signed by a certificate authority. In some embodiments, the scan engine will hold (or be given) a public certificate of the certificate authority that signed the public certificate installed with the scan assistant 210 (and/or as a component of the scan assistant) and the scan engine may use the public certificate of the certificate authority to authorize (e.g. verify the signature of) the public certificate installed with the scan assistant 210. In some embodiments, the public certificate installed with the scan assistant 210 (and/or as a component of the scan assistant) might be self-signed and the scan engine will hold (or be given) the same public certificate installed with the scan assistant 210 to authorize (e.g. verify the signature of) the public certificate installed with the scan assistant 210.

In some aspects, the scan assistant 210 may generate a private key and public certificate pair, and while that public certificate may be exchanged with the scan engine 405 as part of authentication, the public certificate may not be used for authenticating. In order for a private key to be used for authentication, trust may need to be established for the public certificate associated with the private key. In some instances, trust may be established because the scan engine 205 may have a public certificate associated with the private key the scan assistant 210 has for authenticating with the scan engine 205. In some instances, trust may be established because the scan engine 205 may have a public certificate associated with the certificate authority that was used to sign the public certificate held by the scan assistant 210 for authenticating with the scan engine 205. Accordingly, the scan engine 205 may be installed with, configured one or more times, provided when starting a scan of one or more IP addresses and/or hostnames, or requested by the scan engine 205 from a local and/or remote certificate storage vault when starting the scan of an IP address and/or hostname, a public certificate to be used for authenticating the scan assistant 210 with the scan engine 205. Accordingly, the scan assistant 210 may generate a private key and public certificate pair for use with authentication (but not for authenticating), a private key and public certificate pair may be installed or configured one or more times after installation, or a private key and public certificate pair may be requested one or more times from a local and/or remote certificate storage vault.

In some aspects, if a private key is installed/configured on the scan assistant 210, proper 2-way TLS could be done if the corresponding public certificate is also provided to the scan engine 205 (e.g. the scan engine 205 may have both its own private key, plus the scan assistant's 210 public certificate, and the scan assistant 210 may have its own private key, plus the scan engine's public certificate enabling mutual trust (2-way TLS)). In some instances, if a private key is installed/configured on the scan assistant 210 and its corresponding public certificate is signed by a certificate authority, proper 2-way TLS could be done if the public certificate associated with the certificate authority that signed the public certificate held by the scan assistant 210 is provided to the scan engine 205 (e.g. the scan engine 205 may have both its own private key, plus the public certificate associated with the certificate authority that signed the public certificate on the scan assistant 210, and the scan assistant 210 may have its own private key, plus a public certificate signed by a certificate authority whose public certificate is known to the scan engine 205 enabling mutual trust (2-way TLS)). In some instances, both the scan engine 205 and the scan assistant 210 could each have the same or a unique signed public certificate installed/configured/provided to/requested by their respective implementation (e.g. the scan engine 205 may have its own private key, and the scan assistant 210 may have its own private key, and both the scan engine 205 and the scan assistant 210 exchange public certificates signed by the same certificate authority or different certificate authorities where the scan engine 205 has the public certificate associated with the certificate authority that signed the scan assistant 210 public certificate, and the scan assistant 210 has the public certificate associated with the certificate authority that signed the scan engine 205 public certificate enabling mutual trust (2-way TLS)).

At operation 225, the scan engine 205 transmits to the scan assistant 210 a public certificate of the scan engine 205 (certificate B). Certificate B may be transmitted along with a TLS challenge to the scan assistant. In some embodiments, the public certificate B may be generated by the asset owner for authentication with the scan assistant 210 by the scan engine 205 to execute the one or more scan operations on the asset and/or for determining a state of the asset. In some embodiments, the public certificate B may be generated on behalf of an asset owner for authentication with the scan assistant 210 by the scan engine 205 to execute the one or more scan operations on the asset and/or for determining a state of the asset. Public certificate B may be signed with a private key held by the scan engine 205 (e.g. installed/configured with the scan engine 205 or provided to/requested by the scan engine 205), and the public certificate B may be held by the scan assistant 210 (e.g. installed/configured with the scan assistant 210 or provided to/requested by the scan assistant 210). Alternatively, public certificate B may be signed by a certificate authority, the private key and signed public certificate B pair may be held by the scan engine 205 (e.g. installed/configured with the scan engine 205 or provided to/requested by the scan engine 205), and the public certificate of the signing certificate authority may be held by the scan assistant 210 (e.g. installed/configured with the scan assistant 210 or provided to/requested by the scan assistant 210). Additionally or alternatively, the private key and public certificate B pair may be stored with the scan engine 205 during installation of the scan engine 205 on the electronic device for subsequent use by the scan engine 205, for example, with the scan assistant 210. The asset may include at least one computing resource. The scan engine 205 may transmit the certificate B to the scan assistant 210 so that the scan assistant 210 can authenticate the scan engine 205 to perform one or more scan operations on the asset. In some embodiments, the scan engine may hold multiple certificates (e.g. multiple certificate B's) associated with different assets, which it can use to establish TLS connections with the scan assistants on those assets.

In some embodiments, the scan engine 205 may generate the public certificate B. Additionally, or alternatively, the public certificate may be derived from the private key. Additionally, or alternatively, the derived public certificate and the private key may be stored together in a PKCS12 format which may be stored or exist encrypted or unencrypted on the file system or could exist encrypted or unencrypted in memory (e.g., provided as a credential by the NEXPOSER/INSIGHTVM® console that manages scans, credentials, or the like). In some aspects, multiple PKCS12 files may be supported within a single scan so that customers may use multiple private key/public certificate pairs.

At operation 230, the scan assistant 210 authenticates the scan engine using certificate B received from the scan engine 205. For example, the scan assistant may verify that the public certificate B was signed using a private key held by the scan engine. The counterpart public key (or certificate authority) used to verify the certificate may be stored with the scan assistant 210 (e.g. installed/configured with the scan assistant on the asset). In some embodiments, the scan assistant 210 may request from a local certificate store the public certificate needed to perform the verification. In some embodiments, the scan assistant 210 may communicate with a remote certificate authority that issued the public certificate to perform the verification. If the public certificate B is verified, the scan assistant 210 may authenticate the scan engine 205 to execute one or more scan operations on the asset. If the public certificate cannot be verified, the scan assistant 210 may prohibit or prevent the scan engine 205 from executing one or more scan operations on the asset. For example, the scan assistant 210 may deny the request to establish the TLS connection.

At operation 235, the scan assistant 210 transmits its own certificate A to the scan engine. Certificate A may be transmitted as a reply to the scan engine's TLS connection request. At operation 240, the scan engine 205 may verify certificate A to authenticate the scan assistant to complete a two-way certificate authentication process. For example, certificate A may be signed using a second private key held by the scan assistant, and the scan engine may hold the counterpart public certificate. As another example, certificate A may be signed using a certificate authority and the counterpart public certificate held by the scan engine is the public certificate associated with the certificate authority that signed certificate A. In some embodiments, the counterpart public key may be provided to the scan engine through a separate secure process ahead of time, for example, when a scan of the asset or the network is initiated or when the scan assistant was first installed on the asset. In some embodiments, the scan engine may store, encrypted or unencrypted, on the file system or in memory, one or more public certificates and/or public certificates associated with one or more certificate authorities that can be used to verify the certificates from multiple scan assistants.

In some embodiments, the scan engine 205 may not have the scan assistant's public key a priori, and so the scan engine will not authenticate the scan assistant using certificate A. In this case, the scan engine will not establish trust to the scan assistant 210, whose communications may be intercepted and/or modified by a man-in-the-middle attack. However, because the scan assistant 210 has the client certificate from the scan engine 205, any attempt by a man-in-the-middle to modify the public certificate from the scan engine 205 may be detected by the scan assistant 210. Thus, the one-way certificate authentication process allows the scan assistant 210 to trust the scan engine 205, even though the scan engine 205 may not trust the scan assistant 210.

At operation 250, the scan assistant 210 may permit the scan engine 205 to execute the one or more scan operations on the asset. Based on verification of the public certificate B, the scan assistant 210 may authenticate the scan engine 205 to execute one or more scan operations on the asset. After the scan assistant 210 authenticates the scan engine 205 to execute the one or more scan operations on the asset, the scan engine 205 may receive permission from the scan assistant 210 to execute the one or more scan operations on the asset. In some aspects, the scan engine 205 may receive an electronic message from the scan assistant 210 indicating that the scan engine 205 has permission to execute one or more scan operations on the asset. In some aspects, the scan assistant 210 may provide access for the scan engine 205 to execute the one or more scan operations on the asset.

In some aspects, private keys may not have public certificates. A public certificate may refer to an x509 container where x509 stores the public key and provides additional properties associated with the public key. The x509 public certificate may be signed by a private key and the public certificate associated with the signing private key can verify the x509 public certificate signature. In some cases, the private key that signed the x509 public certificate is the private key paired with the x509 public certificate, known as a self-signed public certificate, and the signed x509 public certificate can verify itself. In some cases, such as with a PKI (Public Key Infrastructure), a private key, known as an issuer or signing key, that is not paired with the x509 public certificate may sign the x509 public certificate, known as a signed public certificate, and the public certificate associated with the issuer or signing key can verify the signed x509 public certificate signature.

At operation 260, the scan engine 205, in cooperation with the scan assistant 210, may execute the one or more scan operations on the asset. For example, after the scan engine 205 receives permission from the scan assistant 210 to execute the one or more scan operations on the asset, the scan engine 205 may execute at least one of one or more commands or one or more scripts on the asset. In some embodiments, a scan may involve multiple rounds of scan operations being submitted by the scan engine, and the scan assistant providing multiple rounds of scan results. For example, the scan engine may be configured to send a new round of scan operation(s) based on the results of previously sent scan operations.

In some aspects, after the scan assistant 210 authenticates the scan engine 205 with the scan assistant 210 to execute the one or more scan operations on the asset and after the scan engine 205, in cooperation with the scan assistant 210, executes the one or more scan operations on the asset, the scan assistant 210 may determine that the scan engine 205 may remain authenticated to execute additional scan operations on the asset (e.g. as long as the TLS connection is open). Alternatively, in some aspects, after the scan engine 205, in cooperation with the scan assistant 210, executes the one or more scan operations of the asset, the scan assistant 210 may determine that the scan engine 205 is no longer authenticated with the scan assistant 210 to execute additional scan operations on the asset without performing another authentication procedure, and require the scan engine to reauthenticate (e.g. by establishing a new TLS connection).

In some aspects, TLS may be used to support a hybrid 2-way trust scheme. A hybrid 2-way may rely on the client (e.g., the scan engine) to not verify trust of the server but the server (the scan assistant in this case) to verify trust of the client. After trust is established, other authentication schemes may be used for additional security that may be implemented as a further step within a secured TLS session.

In some embodiments, the scan engine 205 may periodically change its public certificate (certificate B) and associated private key. In at least this case, the scan assistant 210 may be updated so that the scan assistant 210 has the required information to establish trust with the scan engine 205 (e.g. the scan engine 205 can authenticate with the scan assistant 210). In some aspects, this may be done manually and/or rely on another deployment tool such as (e.g., a GPO), or the use of SCCM. The private keys may not be generated on the scan engine 210. However, the private keys may be generated on the NEXPOSER/INSIGHTVM® console, and clients may be permitted to generate their own private keys using third party certificate management tools. The scan engine 205 may support sending the scan assistant 210 a new public certificate when the previous public certificate is no longer the latest/newest public certificate available to the scan engine 205 and the scan assistant 210 may be using an older public certificate (e.g., certificates may have expiration dates). The scan assistant 210 may support receiving a new public certificate from the scan engine 205. If the scan assistant 210 receives from the scan engine 205 a new public certificate and the scan assistant 210 supports receiving from the scan engine 205 a new public certificate the scan assistant 210 may replace (e.g. overwrite) the current public certificate (certificate B) stored in memory and/or on a file system encrypted and/or unencrypted on the asset with the new public certificate from the scan engine 205. In some embodiments, certificate A of the scan assistant may also be periodically changed. If so, the scan assistant may provide the new certificate to the scan engine, for example, as part of a certificate update process with the scan engine.

In some aspects, customers may want continuous updates on risks associated with their assets. However, customers may be left with receiving updates only when an ad-hoc assessment or a scheduled assessment runs. In some cases, when a customer remediates risk, an assessment to verify that the risk was remediated may be run. A scan assistant on an asset monitors for events such as software and/or patch installation or configuration changes. When one or more event(s) occur that meet the criteria, the scan assistant may signal a scan engine, console, an administrator platform, or some other component that an assessment is needed. The signal may be acted upon immediately, queued, or delayed as needed by the system or by a customer described configuration. Near continuous updates may be provided on the risk of the assets without the need to run ad-hoc assessments, configure scheduled assessments, or run remediation assessments.

In some aspects, if the system does not have sufficient resources to process a signal immediately that signal may be queued and the customer will have metrics on the size of the queue and estimated time for queue completion. If the system has sufficient resources, but the customer does not want assessments within the current window of time, the assessment may be queued until assessments of that asset are permitted as per the customer's described configuration. If the system has sufficient resources but the asset is producing a lot of events, the system may defer assessment until the event stream is complete, such as, for example, if a customer is installing multiple patches, or making multiple configuration changes. A delay may minimize a number of assessments that need to run by allowing multiple events to be coalesced into a single assessment. This may minimize asset resource utilization, network utilization, and assessment resources. A delay should be within a reasonable amount of time to minimize the delay in reporting risk to the customer.

In some aspects, scan performance may be directly related to the latency between the scan engine and the asset being scanned. This relationship may be due to a round trip time needed for each request the scan engine makes. The assessment of an asset may result in hundreds or thousands of requests and since each request is synchronous and contingent on the response of prior requests performance decreases as latency increases. As described herein, an asynchronous protocol that supports any number of concurrent requests and tags those requests with an identifier such that the client (scan engine) may identify which request a response is for when it receives that response. This may allow the scan engine to bypass the penalty associated with increasing latency and may allow scan performance to remain about the same across a wide range of latency values.

In some aspects, a single connection capable of servicing multiple questions in parallel (e.g., an asynchronous API) may be provided. Scan engines may often use a synchronous protocol when assessing an asset (e.g., OpenSSH® command/response). Multiple connections to an asset may be created to simulate an asynchronous protocol by allowing multiple threads to assess the asset in parallel via each of the connections made. However, this case may not often scale well. This case may also impose additional resource requirements on networks the scan engine is to traverse to communicate with the asset, may use additional resources on the asset itself, and may use additional resources on the scan engine. These increased resource uses may slow the overall scan or may have a negative effect on network hardware (e.g., crash, performance issues, or a denial of service type experience). An asynchronous protocol servicing all the questions an authenticated scan might ask an asset and the scan engine may only need a single connection and may not cause any of the aforementioned issues a customer might experience with a multi connection approach.

As described herein, a scan assistant may use an HTTPS protocol. The scan assistant may allow sending multiple requests before any one response is received. Thus, several requests can be sent at the same time without waiting for responses, effectively avoiding latency issues or allowing concurrent data collection against the same asset. This case may differ from other protocols where a request waits for a response either due to a protocol limitation, such as to increment a packet count used when cryptographically signing message or due to a limitation of the procedures being called remotely (RPC) via the protocol, such as when one request depends on the result of a previous request.

The scan assistant protocol may implement data collection in an efficient way that tries to avoid the need for chaining multiple calls together. For example, when asking for the data of a registry key value, an SMB protocol may need multiple steps that includes opening a registry hive which returns an identifier associated with the registry hive that was opened. That identifier may then be passed to open the registry key associated with the registry hive which returns an additional identifier. Subsequently, that identifier may be used to then query the registry key for the value whose data is being requested. In this example, there may be three interactions with the scan target which means the network latency for this request will have three times the impact on scan performance. There are several solutions that can help improve long term performance, such as caching identifiers as they are opened so they do not have to be opened again. The scan assistant may work around this problem instead performing all of these operations when a request is made for the data associated with a registry key value. In some aspects, these optimizations may provide a noticeable improvement in scan performance and the overall scan performance improvement increases as latency increases due to the relationship described above where a single request for data might incur the cost of multiple interactions (API calls) between the scan engine and the asset to complete the request.

Figure 3:
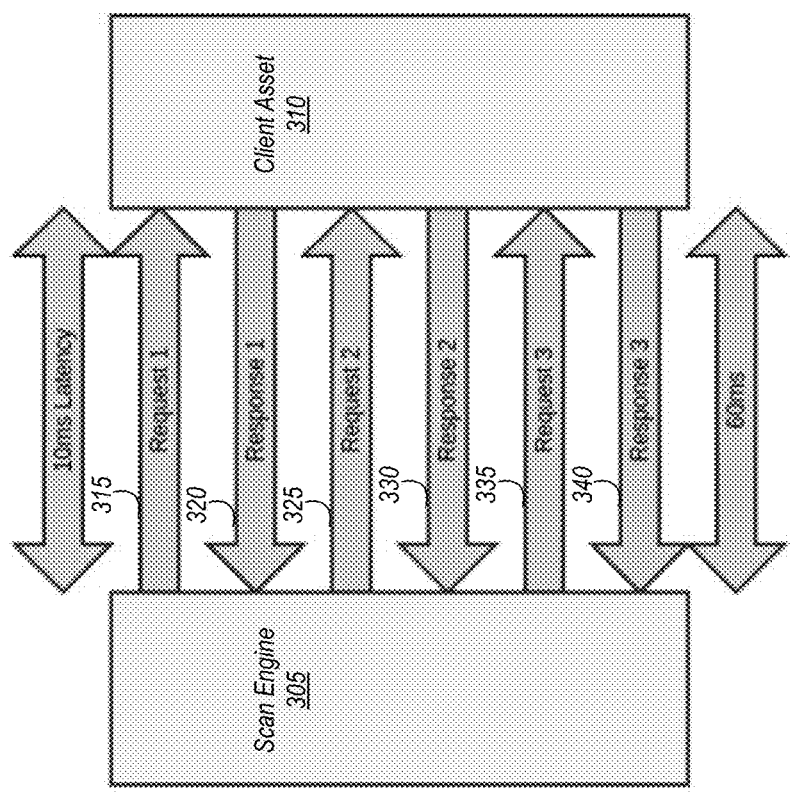
FIG. 3 illustrates an example network computing system for asset assessment according to some aspects.

FIG. 3 illustrates an example network computing system 300 for asset assessment according to some aspects. The example network computing system 300 may include a scan engine 305 and a client asset 310. The network computing system 300 may perform a synchronous protocol. In a synchronous protocol, the scan engine 305 must wait for the response of a previous scan request before transmitting the next scan request. For example, as shown in FIG. 3, using the synchronous protocol, the scan engine 305 may transmit a first scan request 315 to the client asset 310 having a latency of 10 ms. The client asset 315 may respond to the first scan request 315 by transmitting a first scan response 320 to the scan engine 305 having a latency of 10 ms. Subsequently, the scan engine 305 may transmit a second scan request 325 to the client asset 310 having a latency of 10 ms. The client asset 315 may respond to the second scan request 325 by transmitting a second scan response 330 to the scan engine 305 having a latency of 10 ms. Subsequently, the scan engine 305 may transmit a third scan request 335 to the client asset 310 having a latency of 10 ms. The client asset 315 may respond to the third scan request 335 by transmitting a third scan response 340 to the scan engine 305 having a latency of 10 ms. Using a synchronous protocol, a scan engine transmitting three scan requests and receiving three scan responses may have a latency of 60 ms.

Figure 4:
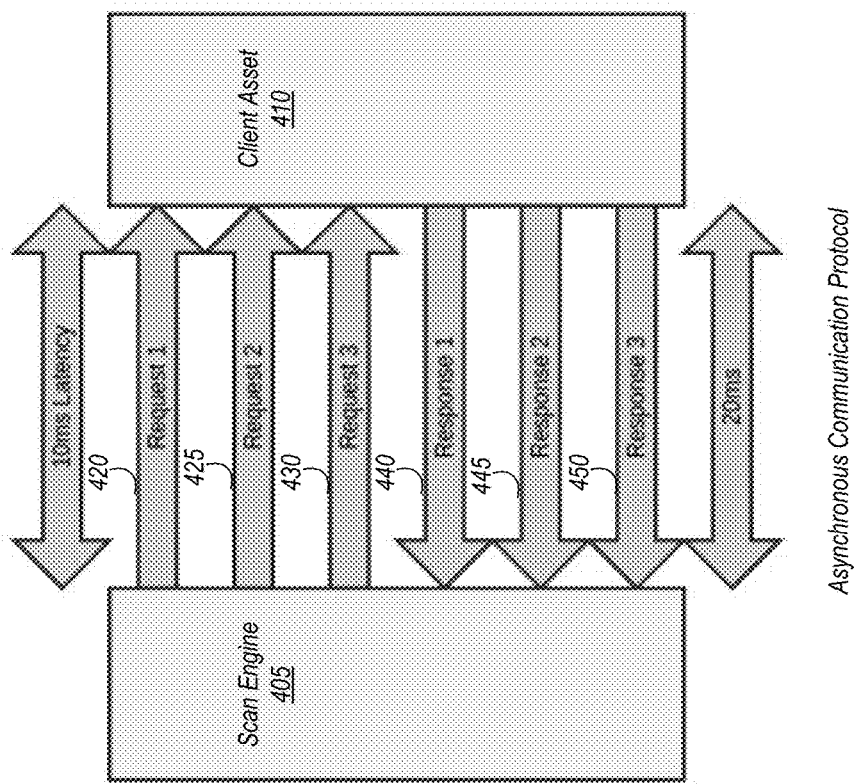
FIG. 4 illustrates an example system for asset assessment according to some aspects.

FIG. 4 illustrates an example system for asset assessment according to some aspects. The example network computing system 400 may include a scan engine 405 and a client asset 410. In some aspects, the client asset 410 may include a scan assistant described herein. The network computing system 400 may perform an asynchronous protocol. For example, as shown in FIG. 4, using the asynchronous protocol, the scan engine 405 may transmit a plurality of scan requests to the client asset 410 including a first scan request 420, a second scan request 425, and a third scan request 430 for a total latency of 10 ms. The client asset 410 may respond to the plurality of scan requests with a plurality of scan responses including a first scan response 440, a second scan response 445, and a third scan response 450 for a total latency of 10 ms. Using an asynchronous protocol, the scan engine is able to send scan requests without waiting for scan responses for previous scan requests. For example, if the network latency between the scan engine 405 and the client asset 410 is 10 ms, it is possible that the three scan requests 420, 425, and 430 can be transmitted at the same time and in parallel, and the three scan responses 440, 445, and 450 can be received in parallel, resulting in a total scan time of only 20 ms. This dramatically reduces the total scan time of 60 ms that was required under the synchronous protocol.

Figure 5:
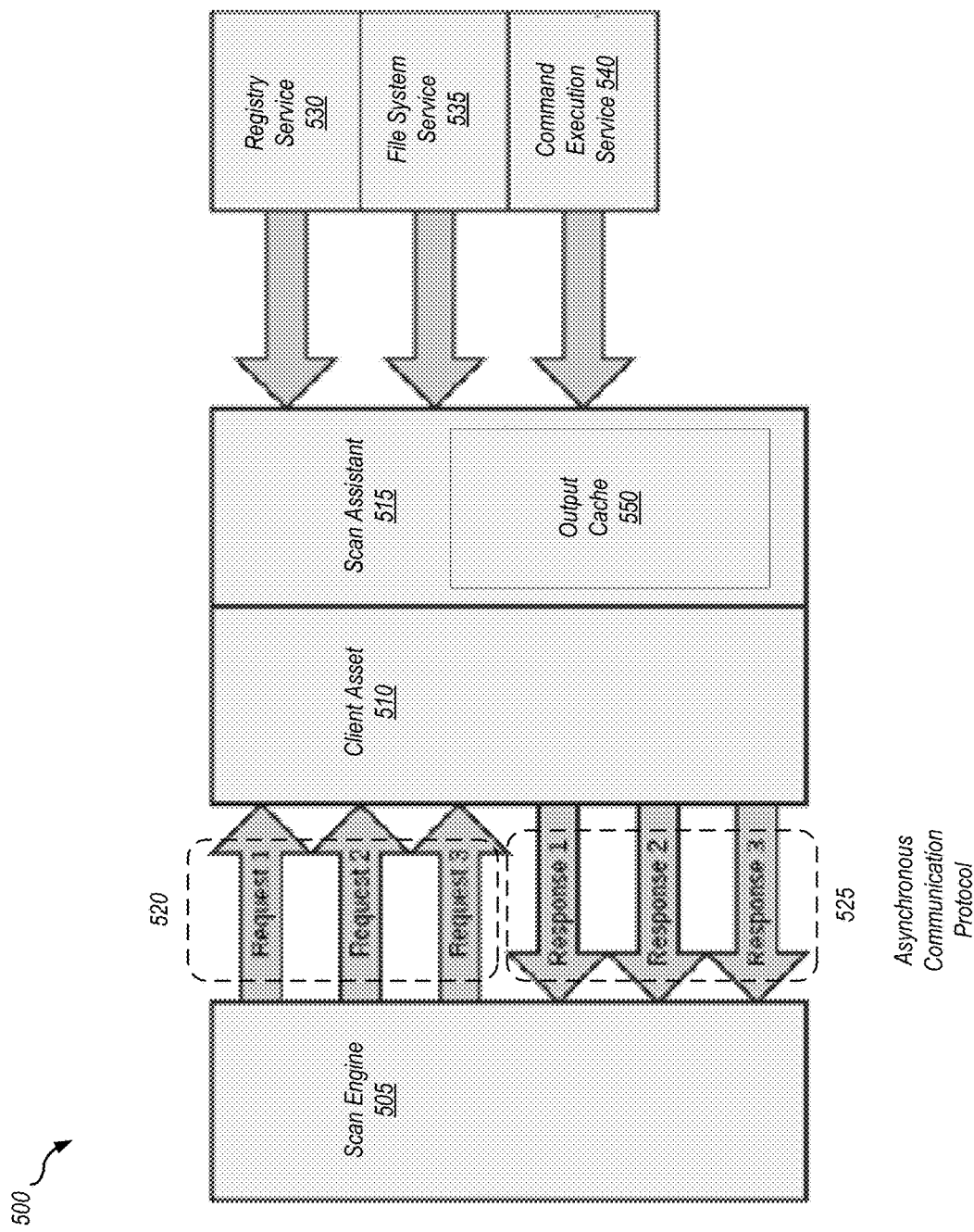
FIG. 5 illustrates an example system for asset assessment according to some aspects.

FIG. 5 illustrates an example system 500 for asset assessment according to some aspects. The example system 500 may include a scan engine 505 and a client asset 510. The system 500 may also include a scan assistant 515 with the client asset 510. As the scan engine 505 transmits a plurality of scan requests 520 to the client asset 510 and the scan assistant 515 and as the client asset 510 and the scan assistant 515 transmit a plurality of scan responses 525 to the scan engine 505. The responses 525 may be generated by the scan assistant 515 from gathering of data about the asset 510. Depending on the embodiment, the data about the asset may be gathered from various services running on the asset 510, such as a registry service 530, a file system service 535, and a command execution service 540, etc.

In some embodiments, the scan engine 505 may implement an asynchronous protocol with the scan assistant 515, so that scan requests 520 can be transmitted in parallel without waiting for the response of previous requests. The responses 525 may also be returned in parallel. In general, the responses 525 may be returned in any order as each response is ready, so that responses are returned in a different order than the corresponding requests were received by the scan assistant. However, in some embodiments, the responses 520 may be returned in the same order as the requests 520 were received by the scan assistant.

In some embodiments, individual ones of the scan requests 520 may be compound scan requests that specify a sequence of scan operations. An earlier scan operation in the sequence may generate an output that will be used by a later scan operation in the sequence. In some embodiments, the response to the compound scan request may indicate the output of the last scan operation in the sequence, but not necessarily outputs of previous scan operations in the sequence. For example, the sequence of scan operations may include a first scan operation to open a registry hive on the asset, a second scan operation to open a registry key in the registry hive, and a third scan operation to query the registry key for an associated value. The scan response for the compound scan request may indicate the value of the registry key that was queried. In some embodiments, a component scan request may specify a script of commands executable on the asset (e.g. a shell script).

In some embodiments, the scan assistant may maintain an output cache 550 to store output generated by scan operations in a sequence of scan operations. Output generated by earlier scan operations in the sequence are written to the cache 550, and read by later scan operations in the sequence from the cache 550. In some embodiments, the data in the output cache 550 may be maintained over multiple scan requests (e.g. multiple compound scan requests in the same scan session), so that the results of all scan requests in a scan session are aggregated in the cache. In some embodiments, if the scan assistant cannot find the input data needed to execute a scan operation in the cache 550, it will wait for the input data to appear in the cache before executing that scan operation. If the input data fails to appear in the cache after all executable scan requests have been executed, the scan assistant will return an error for the scan operation that cannot be executed. In some embodiments, any errors that are detected during execution of a scan operation will be indicated in a scan response back to the scan engine 505. The scan response may indicate the type of error and the particular scan operation or scan request that caused the error.

Figure 6:
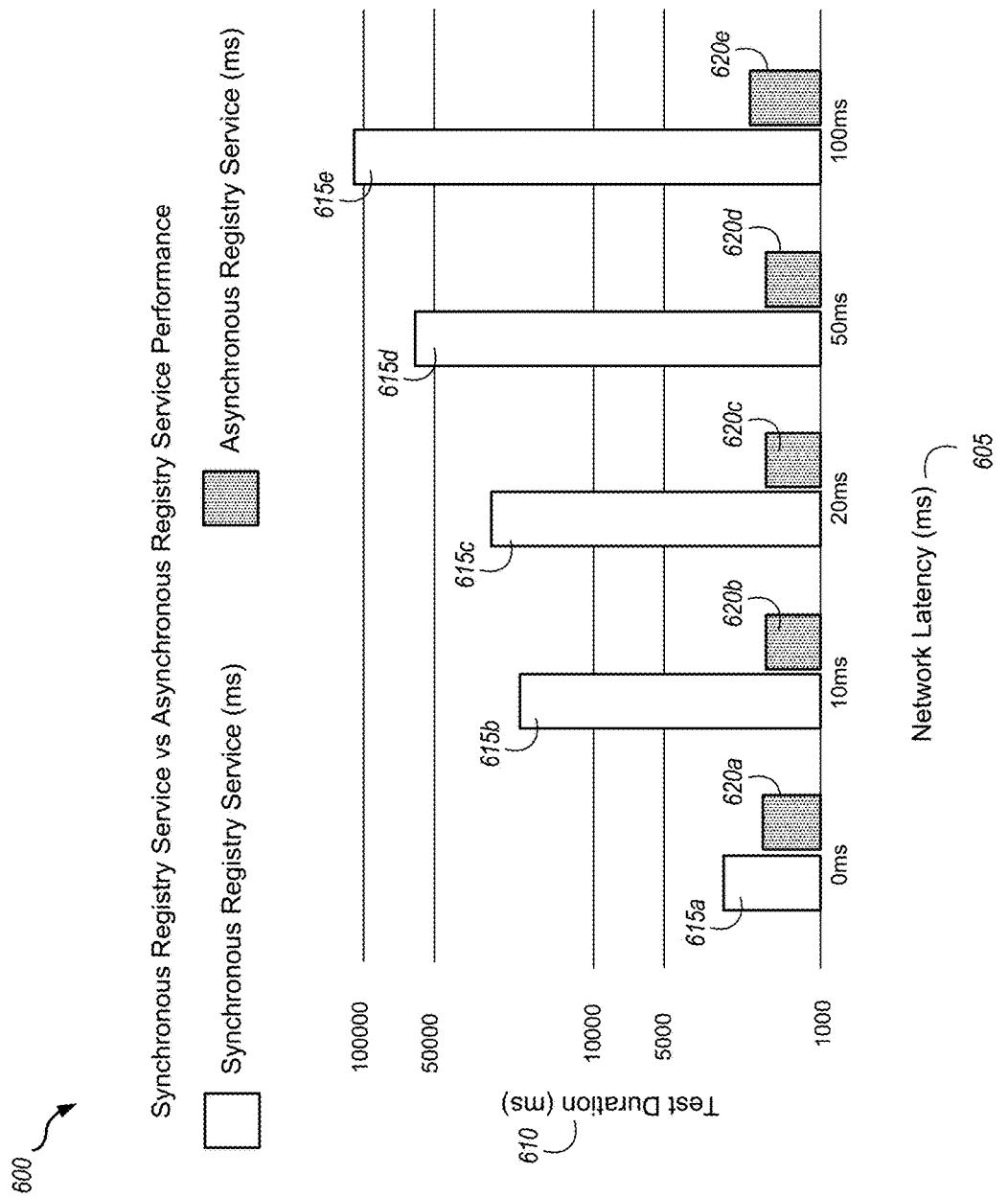
FIG. 6 illustrates an example graph comparing synchronous registry service performance with asynchronous registry service performance according to some aspects.

FIG. 6 illustrates an example graph 600 comparing synchronous registry service performance with asynchronous registry service performance according to some aspects. As shown in FIG. 6, as the latency time (ms) of the network 605 increases for a synchronous protocol, a test duration time (ms) 610 also increases. For example, when the network latency 605 is zero (0) ms, the test duration 610 of the synchronous protocol instance 615a is about 3000 ms. When the network latency 605 is ten (10) ms, the test duration 610 of the synchronous protocol instance 615b is about 25,000 ms. When the network latency 605 is twenty (20) ms, the test duration 610 of the synchronous protocol instance 615c is about 30,000 ms. When the network latency 605 is fifty (50) ms, the test duration 610 of the synchronous protocol instance 615d is about 65,000 ms. When the network latency 605 is one hundred (100) ms, the test duration 610 of the synchronous protocol instance 615e is about 110,000 ms. Conversely, as the network latency 605 increases from 0ms to 10 ms, from 10 ms to 20 ms, from 20 ms to 50 ms, and from 50 ms to 100 ms, the test duration 610 for each of the asynchronous protocols instances 620a, 620b, 620c, 620d, and 620e remains about 2000 ms.

In some aspects, for example, after implementing an asynchronous protocol for remote authenticated assessment of an asset for full utilization, the scan engine may remember all the queries it made against each asset it scanned such that when the scan engine scans the same asset in a future scan it can issue requests for all the data the previous scan collected utilizing the asynchronous nature of the protocol. Doing so may improve scan performance or at least reduce the effect latency has on scan performance. These concepts may only improve future scan performance (the asset must first be scanned to prime the knowledge about what data needs to be collected). The history of queries may be updated with each scan removing questions that are no longer asked and adding new questions.

As described herein, a process is provided in which historic scan requests (e.g. queries or questions) for an asset are first determined in an initial learning scan of the asset and stored for the asset (e.g. in a database on a per asset basis). The process may include that historic queries (questions) are updated with each subsequent scan. The process may also include that if an asynchronous protocol is available all those questions can be asked in parallel to improve scan performance and/or reduce the effect latency has on a scan. If multiple connections are made (a non-asynchronous protocol) questions can be asked in parallel relative to the number of connections made to improve scan performance and/or reduce the effect latency has on a scan.

In some aspects, a scan engine may track what it collected against a given asset and may store what resources it collected per asset in a database or flat file. Future scans may then recollect the same resources by sending requests for all the resources stored in the database or flat file at the same time. Thus, data may be asynchronously collected so that, for example, the scan engine may not wait for responses while making requests. Also, data may be asynchronously collected relative to the scan of that asset so that, for example, data is collected before the scan needs it in preparation for the scan potentially needing it. This may result in a considerable overall performance improvement for authenticated scans across all amounts of network latency. In some aspects, authenticated scans of an asset may take almost the same amount of time to complete regardless of the network latency between the scan engine and the asset, normalizing scan performance across all amounts of network latency. This may also create new and exciting options for providing scan services to customers such as hosted scan engines in a platform that can scan corporate networks with appropriate precautions and configurations.

To avoid the database or flat file experiencing continuous growth in size, a feedback loop may exist where for each scan of the resources used may be stored in the database or flat file. Thus, a scan may create the database, update the database, or update the flat file when appropriate after each scan. The contents of the database or flat file may reflect only the resources used by the previously completed scan for the next scan to improve performance by asynchronously collecting what the previous scan collected and storing the results of that collection in a cache as part of an initialization of the scan of that asset. The scan of the asset may first use the cache that was asynchronously populated as part of the initialization phase of scanning the asset, and may directly interact with the scan assistant when new data is needed so that, for example, the cache may not have an answer to a question that was previously asked (e.g., data may need to be collected that was not collected as part of the initialization phase). The scan engine may keep track of what data was requested when scanning the asset. For example, the scan engine may keep track of what was read from the cache, and/or what was written to the cache after initialization was complete. The scan engine may then update the database or flat file with data that was requested when scanning the asset, and/or remove data entries that may have been requested in prior scans but were not used in the latest scan. Thus, the database or flat file may reflect resources that need to be collected as per the requirements of the last scan that was executed. Each asset that is scanned may have its own cache, and/or an entry within a shared cache.

In some aspects, a resource, collected data, or scan request may be represented by the identifier of the actual data being collected (e.g. a registry key or file name on the asset). In some embodiments, the collected data may be a pointer to the data but not actually the data itself. The scan engine may not persist in the database or flat file the data itself, but only points to the data. This may be used to tell the scan assistant what to collect. The data itself may be stored in the cache, when an asset is scanned, and discarded when the scan of an asset is complete such that only the pointers to that data persist in the database or flat file.

The concepts provided herein may provide considerable scan performance improvement for all scans, may normalize scan performance regardless of network latency, and by storing only pointers to data, may minimize an amount of data storage needed. In addition, these concepts may be implemented with a cloud/platform or on-premise centralized database/flat file for storage of the collected resources on a per asset basis, instead of the database/flat file being stored on the scan engine.

Figure 7:
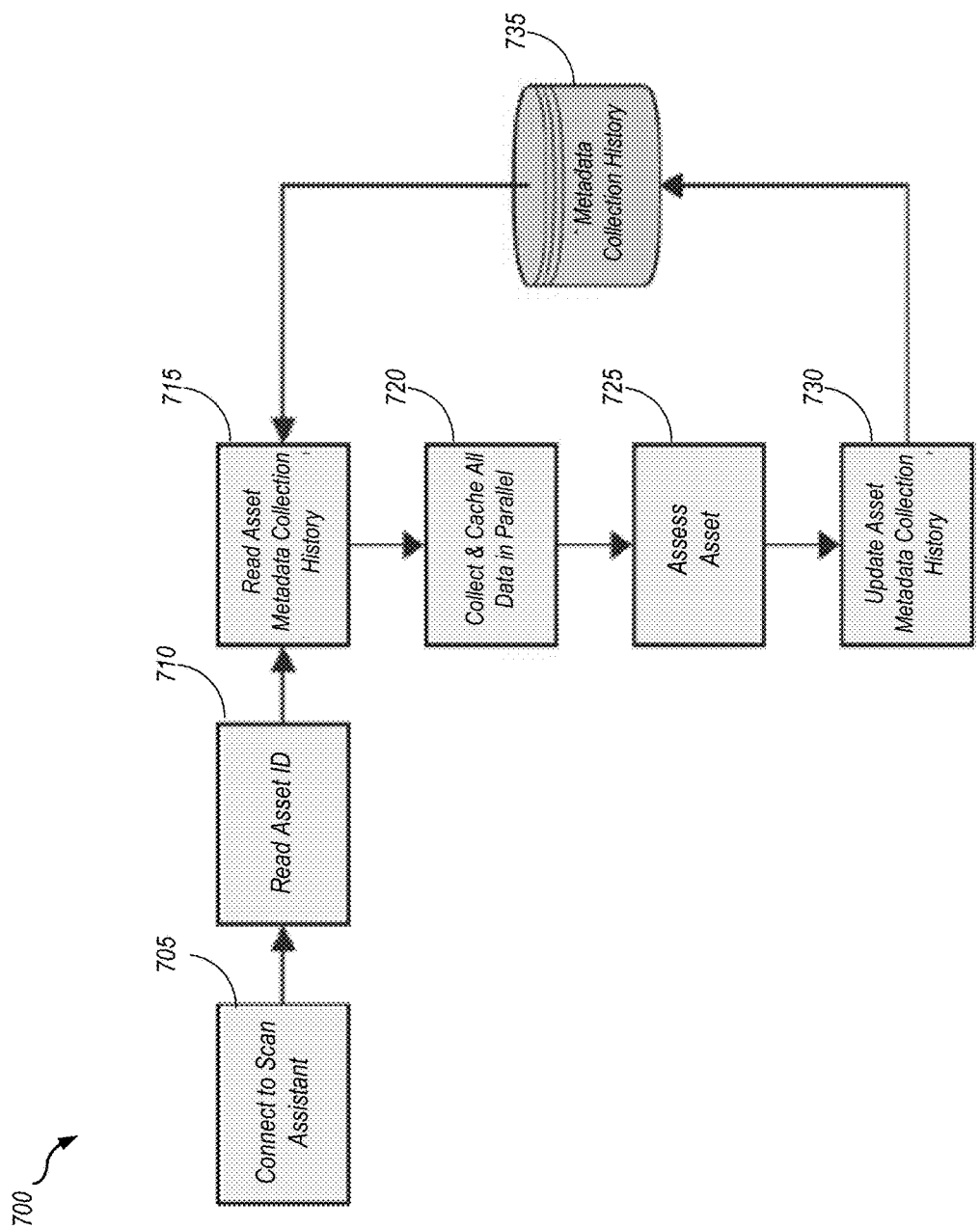
FIG. 7 illustrates an example method for performing scan recollection asset assessment according to some aspects.

FIG. 7 illustrates an example method 800 for performing scan recollection asset assessment according to some aspects. The example method 700 may be performed by the scan engine 120 illustrated in FIG. 1, the scan engine 205 illustrated in FIG. 2, the scan engine 305 illustrated in FIG. 3, the scan engine 405 illustrated in FIG. 4, and/or the scan engine 505 illustrated in FIG. 5. As shown in FIG. 7, at block 705, the scan engine may be connected to a scan assistant as described herein.

At block 710, the scan engine may read an asset ID to identify the particular asset for scanning. At block 715, the scan engine may read asset metadata for the asset ID from the metadata collection history storage unit 735 (e.g. a database or data store), to determine scan requests that were used to collect data from asset in one or more previous scans of the asset (e.g. from an initial learning scan of the asset).

In some embodiments, a learning scan of the asset may be performed in a sequential manner, where one or more later scan request(s) in a sequence of scan requests are determined based on responses of one or more earlier scan request(s). As one example, the sequence of learned scan requests may include a first request to determine a fingerprint of an operating system used by the asset, a second request to query a configuration registry used by the operating system, to detect a software installed on the asset, and a third request to obtain information about the software detected on the asset. As another example, the sequence of learned scan requests may include a first request to determine a fingerprint of an operating system used by the asset, one or more further request(s) to determine fingerprints of different types of software installed on the asset, and one or more additional request(s) to obtain information about the different types of software installed on the asset.

In some embodiments, the metadata collection history of the asset may be stored in the storage 735 and associated with the asset ID, so that the metadata collection history of different assets can be stored on a per-asset basis. Depending on the embodiment, the storage 735 may be stored in a database or one or more data files, which may be located at a centralized location accessible by multiple scan engines.

At block 720, the scan engine collects data from the asset using scan requests retrieved from the metadata collection history storage unit 735. In some embodiments, operation 720 may be performed as a preparation phase of the scan of the asset to populate the cache for the scan. In some embodiments, when the stored scan requests are used again, they are sent to the asset as a batch without individual scan requests having to wait for responses for other scan requests in the batch. As discussed, this batching of scan requests will substantially shorten the amount of time required to perform the stored scan requests. At block 725, the scan engine may scan or assess the asset by sending additional scan requests using the cached data about the asset. Operation 725 may be performed as one or more later phases of the scan after the preparation phase.

At block 730, the scan engine may update the metadata collection history storage unit 735 with the most current metadata used to scan or assess the asset. For example, the metadata collection history may be updated to add new scan requests that were used by the current scan but were not used in the previous scan(s). As another example, the metadata collection history may be updated to remove one or more old scan requests that were previously used by earlier scan(s) but not used by the most recent scan. In some embodiments, the scan requests stored in the metadata collection history storage 735 are reused for subsequent scans. Thus, each successive scan of the asset acts as a learning scan for the next scan of the asset.

In some embodiments, the scan engine or another system accessible to the scan engine may generate a baseline of scan requests to scan new assets that have not previously been scanned. This baseline may be generated from the contents of the metadata collection history storage 735, based on the previous scan requests of similar assets. For example, a baseline of scan requests may be generated for assets that use the same or similar operating systems. A more detailed baseline may be generated for assets having similar software installed. These baselines may be updated periodically based on the changing contents of the metadata collection history storage and defined for many different categories of assets.

Figure 8:
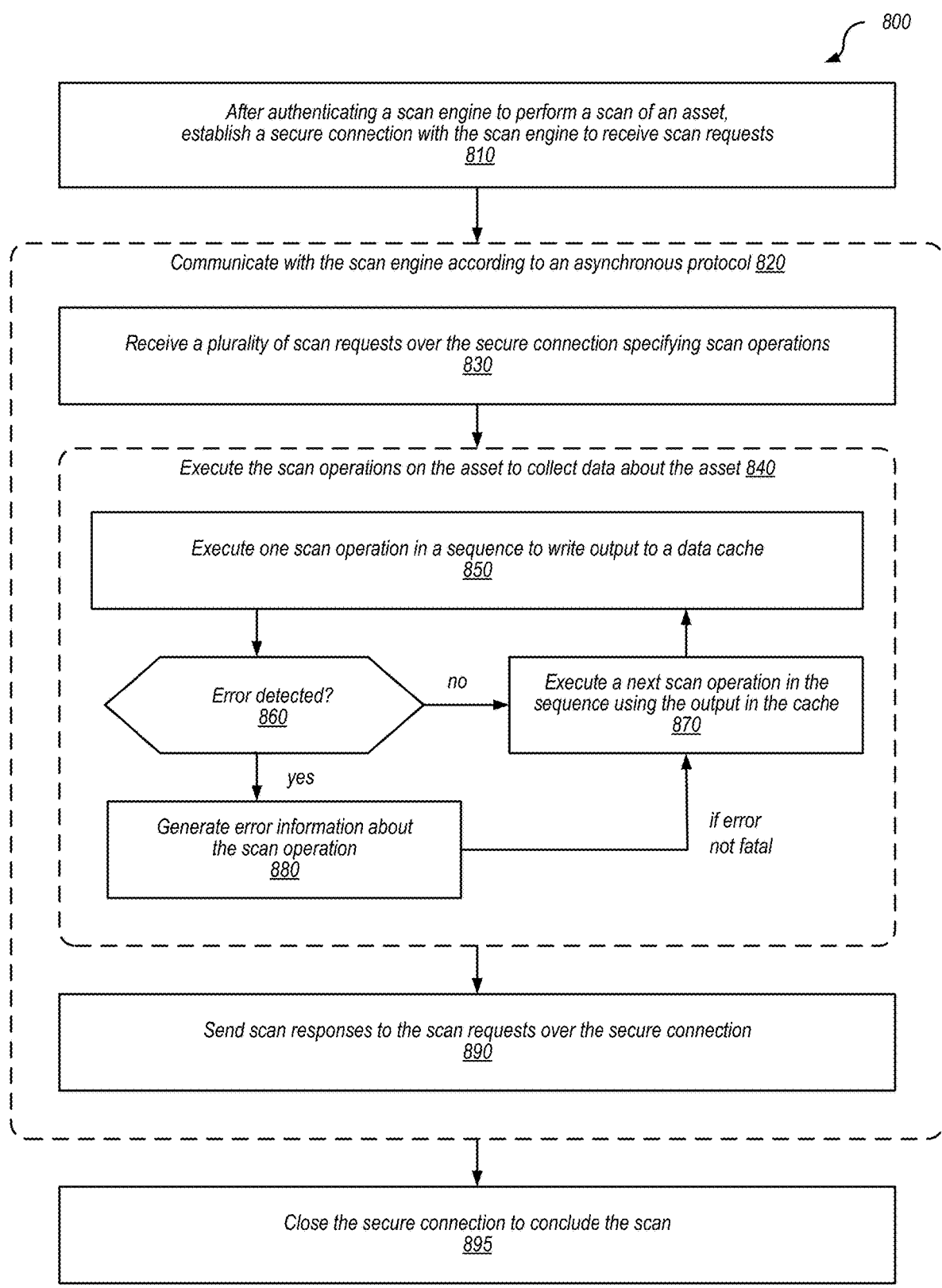
FIG. 8 is a flowchart illustrating a process implemented by a scan assistant on a computing device for collecting asset data using an asynchronous scan protocol for asset assessment, according to aspects.

FIG. 8 is a flowchart illustrating a process implemented by a scan assistant on a computing device for collecting asset data using an asynchronous scan protocol for asset assessment, according to aspects. The process may be performed by an embodiment of the scan assistant 125 of FIG. 1 or scan assistant 515 of FIG. 5, for example.

At operation 810, a secure connection is established with the scan engine to perform a scan of the asset which the scan assistant is running on. The scan may be used to determine a state of the asset, which may be used to assess the asset for various purposes (e.g. to determine security vulnerabilities of the asset). The connection (e.g. a TLS connection) may be established after the scan assistant authenticates the scan engine to perform the scan. In some embodiments, this authentication and establishing of the secure connection may be performed in the manner described in connection with FIG. 2.

As shown, once the secure connection is established to the scan engine, the scan assistant and scan engine may communicate 820 via an asynchronous communication protocol to exchange scan requests and scan responses. In some embodiments, the asynchronous communication protocol will permit the scan engine to send multiple scan requests in a batch or in parallel, without having to wait for scan response to be received for a particular request in the batch. Likewise, scan responses from the scan assistant may be submitted in any order, which may be the same order in which corresponding scan requests are received by the scan assistant. In some embodiments, a scan of the asset may include multiple rounds of scan requests and scan responses, where some scan requests are sent without waiting for scan responses, and other scan requests are sent after certain scan responses are received. In some embodiments, the asynchronous communication protocol used may be as described in connection with FIG. 4.

At operation 830, the scan assistant receives scan requests from the scan engine over the secure connection, specifying scan operations to be performed on the asset. When these scan requests are received, the scan assistant executes 840 the scan operations on the asset to collect data about the asset. Some of the scan operations that are unrelated may be executed in parallel, while other scan operations are executed in a sequence. In some embodiments, a sequence of scan operations may be specified as a compound scan request that indicates the order in which multiple scan operations are to be executed. The scan operations may include a variety of operations on the asset to collect data, such as to read files, read configuration registry data, collect statistics or performance data, calculate performance metrics, etc. In some embodiments, a scan operation may execute a script of multiple commands (e.g. shell commands) on the asset.

Operations 850 to 880 illustrates an example execution of a sequence of scan operations. As shown, at operation 850, one scan operation in the sequence is executed. The scan operation is configured to write its output to a data cache (e.g. output cache 550), so that it can be used by later scan operations in the sequence. In some embodiments, data in the cache may be retained so that subsequent scan requests (e.g. scan requests that are part of the same scan) may also use the cache data. In some embodiments, the cache data may be retained across multiple asset scans.

If there was an error detected 860 during execution of the scan operation, error information may be generated at operation 880. Some types of errors may halt the sequence of scan operations, while other types of errors may only be recorded without stopping the sequence. The error information may identify the specific operation that caused the error, and will be included in one or more scan response(s) returned to the scan engine. If there was not error or the error is not fatal, a next scan operation in the sequence is executed at operation 870, using the output left by the previous operation in the cache. The next operation may again write its output to the cache, and the process will loop until the entire sequence of scan operation is performed. In some cases, the previous results of intermediate operations in the sequence are not returned to the scan engine in the scan response; only the output of the last scan operation in the sequence is returned in the scan response. As one example, a sequence of scan operations may include a first scan operation to open a registry hive on the asset, a second scan operation that opens a registry key in the registry hive, and a third scan operation to query the registry key for an associated value, so as to return the value of the registry key in the scan response.

At operation 890, scan responses are sent back to the scan engine over the secure connection. As discussed, the scan responses are returned according to the asynchronous communication protocol, which may allow the scan assistant to send responses in any order. In some embodiments, the scan responses may be sent in the same order in which corresponding scan requests are received by the scan assistant. In some embodiments, the scan responses may be returned out-of-order, and may indicate the request ID of the corresponding request so that the scan engine can understand how individual responses map to the requests. In some embodiments, a single scan request from the scan engine may cause multiple scan responses to be generated by the scan assistant. In such embodiments, these related responses may be tagged with metadata to indicate their relationship, and the scan engine will use this metadata to piece together the multiple scan responses. In some embodiments, individual scan responses may be sent as soon as they are ready. In some embodiments, certain scan requests may be sent together as a single batch, for example, in order to reduce the number of network communications. Once all scan responses have been sent (or if the asset scan otherwise terminates), the secure connection is closed at operation 895.

Figure 9:
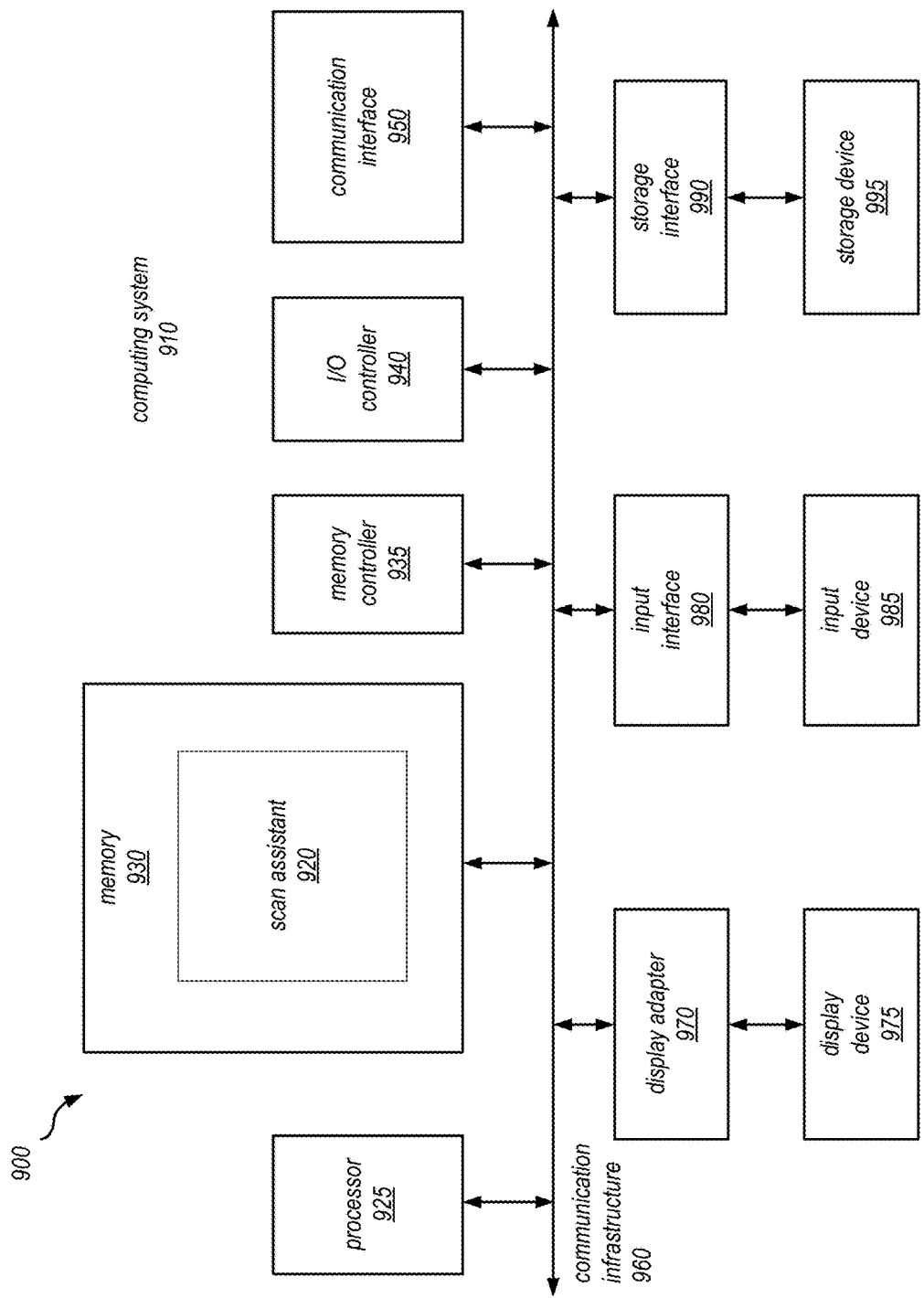
FIG. 9 is a block diagram of a computing device having a scan assistant that may be used to implement asset scanning according to some aspects.

FIG. 9 is a block diagram of a computing device having a scan assistant that may be used to implement asset scanning according to some aspects. As shown in FIG. 9, the computing system 910 includes a scan assistant 920, for example, stored on the memory 930. The scan assistant 920 may include one or more electronically executable instructions that, when executed by the processor 925, may cause the processor 925 to authenticate a scan engine with the scan assistant 920 to execute one or more scan operations on the asset and permit a scan engine to execute one or more scan operations on an asset. In some embodiments, the scan assistant 920 may detect one or more events associated with the asset, and transmit, to a scan engine, an event message indicating the one or more events associated with the asset and that a scan of the asset is needed. The scan assistant 920 may be the same as or at least similar to the scan assistant 125 illustrated in FIG. 1.

In certain embodiments, computing system 910 may also include one or more components or elements in addition to processor 925 and/or memory 930. For example, as shown, computing system 910 may include a memory controller 935, an Input/Output (I/O) controller 940, and a communication interface 950, each of which may be interconnected via a communication infrastructure. Communication infrastructure 960 generally represents any type or form of infrastructure capable of facilitating communication between one or more components of a computing device. Examples of communication infrastructure 960 include, without limitation, a communication bus (such as an Industry Standard Architecture (ISA), Peripheral Component Interconnect (PCI), PCI express (PCIe), or similar bus) and a network.

Memory controller 935 generally represents any type/form of device capable of handling memory or data or controlling communication between one or more components of computing system 910. In certain embodiments memory controller 935 may control communication between processor 925, memory 930, and I/O controller 940 via communication infrastructure 960, and may perform and/or be a means for performing, either alone or in combination with other elements, one or more of the operations or features described and/or illustrated herein. I/O controller 940 generally represents any type or form of module capable of coordinating and/or controlling the input and output functions of a computing device. For example, in certain embodiments I/O controller 940 may control or facilitate transfer of data between one or more elements of computing system 910, such as processor 925, memory 930, communication interface 950, display adapter 970, input interface 980, and storage interface 990.

Communication interface 950 broadly represents any type/form of communication device/adapter capable of facilitating communication between computing system 910 and other devices and may facilitate communication between computing system 910 and a private or public network. Examples of communication interface 950 include, a wired network interface (e.g., network interface card), a wireless network interface (e.g., a wireless network interface card), a modem, and any other suitable interface. Communication interface 950 may provide a direct connection to a remote server via a direct link to a network, such as the Internet, and may also indirectly provide such a connection through, for example, a local area network. Communication interface 950 may also represent a host adapter configured to facilitate communication between computing system 910 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 910 may also include at least one display device 975 coupled to communication infrastructure 960 via a display adapter 970 that generally represents any type or form of device capable of visually displaying information forwarded by display adapter 970. Display adapter 970 generally represents any type or form of device configured to forward graphics, text, and other data from communication infrastructure 960 (or from a frame buffer, as known in the art) for display on display device 975. Computing system 910 may also include at least one input device 985 coupled to communication infrastructure 960 via an input interface 980. Input device 985 generally represents any type or form of input device capable of providing input, either computer or human generated, to computing system 910. Examples of input device 985 include a keyboard, a pointing device, a speech recognition device, or any other input device.

Computing system 910 may also include storage device 995 coupled to communication infrastructure 960 via a storage interface 990. Storage device 995 generally represents any type or form of storage devices or mediums capable of storing data and/or other computer-readable instructions. For example, storage device 995 may include a magnetic disk drive (e.g., a so-called hard drive), a floppy disk drive, a magnetic tape drive, an optical disk drive, a flash drive, or the like. Storage interface 990 generally represents any type or form of interface or device for transmitting data between storage device 995, and other components of computing system 910. Storage device 995 may be configured to read from and/or write to a removable storage unit configured to store computer software, data, or other computer-readable information. Examples of suitable removable storage units include a floppy disk, a magnetic tape, an optical disk, a flash memory device, or the like. Storage device 995 may also include other similar structures or devices for allowing computer software, data, or other computer-readable instructions to be loaded into computing system 910. For example, storage device 995 may be configured to read and write software, data, or other computer-readable information. Storage device 995 may also be a part of computing system 910 or may be separate devices accessed through other interface systems.

Many other devices or subsystems may be connected to computing system 910. Conversely, all of the components and devices illustrated in the figure need not be present to practice the embodiments described and/or illustrated herein. The devices and subsystems referenced above may also be interconnected in different ways from that shown in the figure. Computing system 910 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 910 for storage in memory via a network such as the Internet or upon a carrier medium.

Figure 10:
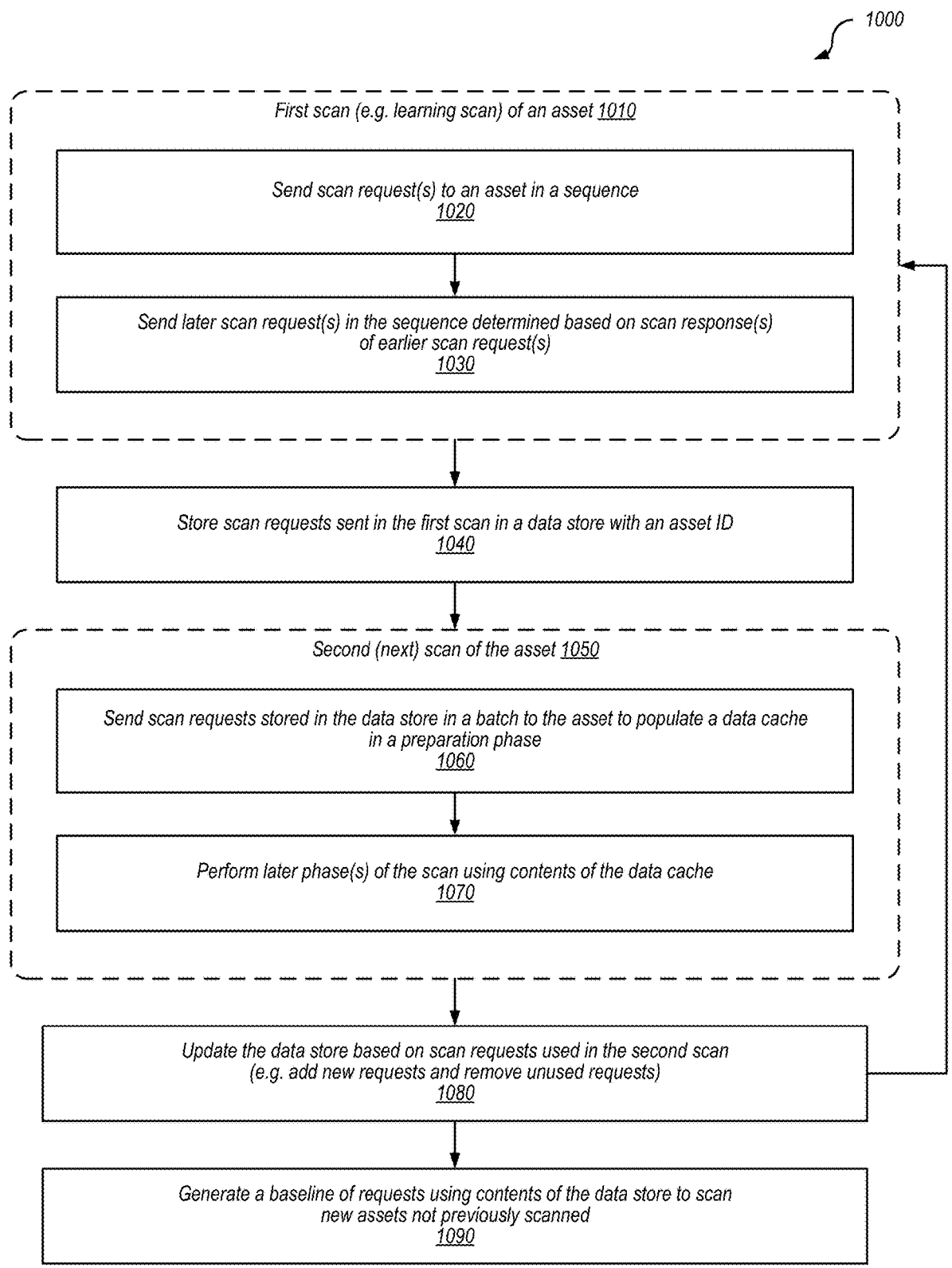
FIG. 10 is a flowchart illustrating a process implemented by a scan engine on a computing device for performing scan recollections for asset assessment, according to aspects.

The computer-readable medium containing the computer program may be loaded into computing system 910. All or a portion of the computer program stored on the computer-readable medium may then be stored in memory 930, and/or various portions of storage device 995. When executed by processor 925, a computer program loaded into computing system 910 may cause processor 925 to perform and/or be a means for performing the functions of one or more of the embodiments described/illustrated herein. Alternatively, one or more of the embodiments described and/or illustrated herein may be implemented in firmware and/or FIG. 10 is a flowchart illustrating a process implemented by a scan engine on a computing device for performing scan recollections for asset assessment, according to aspects. The process may be performed by an embodiment of the scan engine 120 of FIG. 1 or scan engine 305 of FIG. 3, for example.

As shown, the process begins with a first scan 1010 of an asset. The first scan may be a learning scan performed on the asset (e.g. an initial scan of a new asset). In some embodiments, a learning scan may be performed whenever is a new asset is detected (e.g. an asset that is not recognized by the scan engine). The scan may be initiated using the process described in connection with FIG. 2, for example, with the scan engine transmitting a request to be authenticated by a scan assistant running on the asset, and then establishing a secure connection to conduct the scan. In some embodiments, the learning scan will send scan requests in a sequential fashion, where later scan requests sent 1030 in the sequence are determined based on scan responses generated by earlier scan requests sent 1020 in the sequence. For example, a learned sequence of scan requests may include a first request to determine a fingerprint of an operating system used by the asset, a second request to query a configuration registry used by the operating system, to detect a software installed on the asset, and a third request to obtain information about the software installed on the asset. As another example, a learned sequence may include a first request to determine a fingerprint of an operating system used by the asset, further requests to determine fingerprints of different types of software installed on the asset, and additional requests to obtain information about the different types of software installed on the asset.

At operation 1040, the scan requests that were used in the first scan are stored in a data store, along with the identifier of the asset. These scan requests are stored so that they can be later reused during a recollection scan performed on the asset. In some embodiments, if the scan engine cannot find the asset in the data store for a new scan, it will perform a learning scan of the asset. In some embodiments, the scan requests may be stored as identifiers of metadata items that were collected from the asset, or pointers to the metadata items (e.g. registry keys, particular files, etc.) The contents of the data store may be updated by subsequent scans of the same asset. The data store may be implemented in a variety of forms depending on the embodiment. For example, the data store may be a database or one or more data files. In some embodiments, the data store may be implemented at a centralized location and shared or accessible by multiple scan engines. The data store may store information about many assets, and store scan request information for the assets on a per-asset basis.

As shown, in a second scan 1050 of the asset, which may be the next scan of the asset after the first scan, the contents of the data store are used to perform a preparation phase of the scan. In the preparation phase, the scan requests stored in the data store for the asset are automatically sent to the asset in a batch (not a sequence as in the first scan), where individual scan requests in the batch are sent without having to wait for respective scan response(s) of other scan request(s) in the batch. Depending on the embodiment, the batch may be sent over a single network connection according to an asynchronous communication protocol, or in parallel over a plurality of network connections. The scan requests are used to populate a data cache used by the second scan, which will store output of the scan requests for use by later phases 1070 of the second scan. By sending these stored requests as a preparation step and as a batch, the second request of the asset can be performed more quickly.

At operation 1080, the scan engine updates the data store based on scan requests used in the second scan. The update will cause the data store to reflect a current state of the set of preparatory scan requests used on the asset. For example, if a new scan request was needed to scan the asset in the second scan, the new request will be added to the data store. If an old scan request in the data store was not used by the second scan, it may be removed from the data store. In some embodiments, the scan engine may simply replace the store scan requests for the asset with the set of scan requests that were actually used in the second scan. As shown, this process may loop so that the data store is updated for each successive scan of the asset, where each new scan will perform the preparation phase using scan requests used by the last scan.

At operation 1090, a baseline of scan requests is generated using contents of the data store to use for new assets that were not previously scanned. In some embodiments, this baseline may be generated by reusing scan requests stored for similar assets, for example, assets using the same operating system or same set of installed software. Baselines may be generated for different configurable categories of assets to use for new asset scanning.

Figure 11:
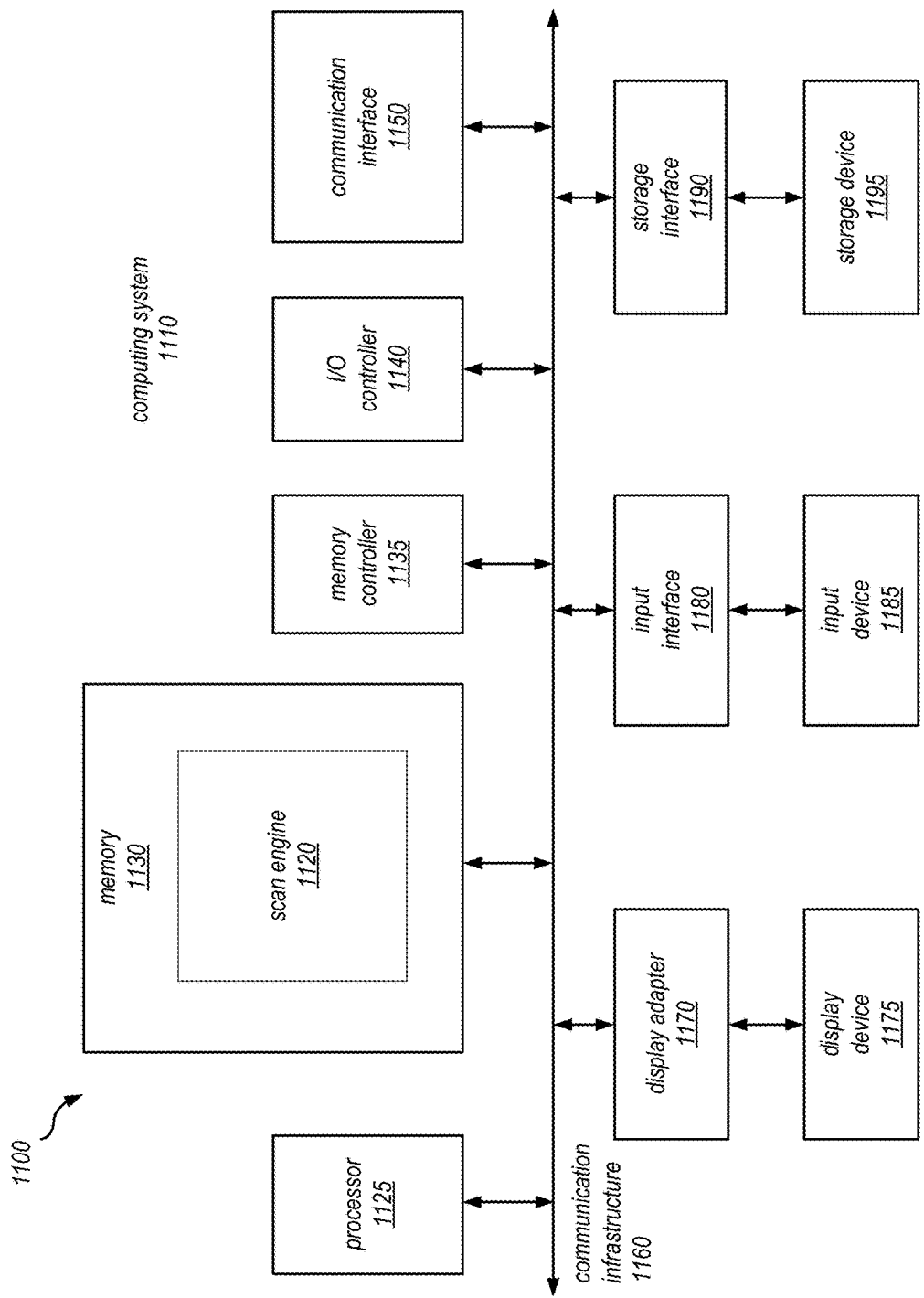
FIG. 11 is a block diagram of a computing device having a scan engine that may be used to implement asset scanning according to some aspects.

FIG. 11 is a block diagram of a computing device having a scan engine that may be used to implement asset scanning according to some aspects. As shown in FIG. 11, the computing system 1110 includes a scan engine 1120, for example, stored on the memory 1130. The scan engine 1120 may include one or more electronically executable instructions that, when executed by the processor 1125, may cause the processor 1125 to authenticate with a scan assistant on the asset to execute one or more scan operations on the asset. The scan engine 1120 may be the same as or at least similar to the scan engine 120 illustrated in FIG. 1.

In certain embodiments, computing system 1110 may also include one or more components or elements in addition to processor 1125 and/or memory 1130. For example, as shown, computing system 1110 may include a memory controller 1135, an Input/Output (I/O) controller 1140, and a communication interface 1150, each of which may be interconnected via a communication infrastructure. Communication infrastructure 1160 generally represents any type or form of infrastructure capable of facilitating communication between one or more components of a computing device. Examples of communication infrastructure 1160 include, without limitation, a communication bus (such as an Industry Standard Architecture (ISA), Peripheral Component Interconnect (PCI), PCI express (PCIe), or similar bus) and a network.

Memory controller 1135 generally represents any type/form of device capable of handling memory or data or controlling communication between one or more components of computing system 1110. In certain embodiments memory controller 1135 may control communication between processor 1125, memory 1130, and I/O controller 1140 via communication infrastructure 1160, and may perform and/or be a means for performing, either alone or in combination with other elements, one or more of the operations or features described and/or illustrated herein. I/O controller 1140 generally represents any type or form of module capable of coordinating and/or controlling the input and output functions of a computing device. For example, in certain embodiments I/O controller 1140 may control or facilitate transfer of data between one or more elements of computing system 1110, such as processor 1125, memory 1130, communication interface 1150, display adapter 1170, input interface 1180, and storage interface 1190.

Communication interface 1150 broadly represents any type/form of communication device/adapter capable of facilitating communication between computing system 1110 and other devices and may facilitate communication between computing system 1110 and a private or public network. Examples of communication interface 1150 include, a wired network interface (e.g., network interface card), a wireless network interface (e.g., a wireless network interface card), a modem, and any other suitable interface. Communication interface 1150 may provide a direct connection to a remote server via a direct link to a network, such as the Internet, and may also indirectly provide such a connection through, for example, a local area network. Communication interface 1150 may also represent a host adapter configured to facilitate communication between computing system 1110 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 1110 may also include at least one display device 1175 coupled to communication infrastructure 1160 via a display adapter 1170 that generally represents any type or form of device capable of visually displaying information forwarded by display adapter 1170. Display adapter 1170 generally represents any type or form of device configured to forward graphics, text, and other data from communication infrastructure 1160 (or from a frame buffer, as known in the art) for display on display device 1175. Computing system 1110 may also include at least one input device 1185 coupled to communication infrastructure 1160 via an input interface 1180. Input device 1185 generally represents any type or form of input device capable of providing input, either computer or human generated, to computing system 1110. Examples of input device 1185 include a keyboard, a pointing device, a speech recognition device, or any other input device.

Computing system 1110 may also include storage device 1195 coupled to communication infrastructure 1160 via a storage interface 1190. Storage device 1195 generally represents any type or form of storage devices or mediums capable of storing data and/or other computer-readable instructions. For example, storage device 1195 may include a magnetic disk drive (e.g., a so-called hard drive), a floppy disk drive, a magnetic tape drive, an optical disk drive, a flash drive, or the like. Storage interface 1190 generally represents any type or form of interface or device for transmitting data between storage device 1195, and other components of computing system 1110. Storage device 1195 may be configured to read from and/or write to a removable storage unit configured to store computer software, data, or other computer-readable information. Examples of suitable removable storage units include a floppy disk, a magnetic tape, an optical disk, a flash memory device, or the like. Storage device 1195 may also include other similar structures or devices for allowing computer software, data, or other computer-readable instructions to be loaded into computing system 1110. For example, storage device 1195 may be configured to read and write software, data, or other computer-readable information. Storage device 1195 may also be a part of computing system 1110 or may be separate devices accessed through other interface systems.

Many other devices or subsystems may be connected to computing system 1110. Conversely, all of the components and devices illustrated in the figure need not be present to practice the embodiments described and/or illustrated herein. The devices and subsystems referenced above may also be interconnected in different ways from that shown in the figure. Computing system 1110 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1110 for storage in memory via a network such as the Internet or upon a carrier medium.

The computer-readable medium containing the computer program may be loaded into computing system 1110. All or a portion of the computer program stored on the computer-readable medium may then be stored in memory 1130, and/or various portions of storage device 1195. When executed by processor 1125, a computer program loaded into computing system 1110 may cause processor 1125 to perform and/or be a means for performing the functions of one or more of the embodiments described/illustrated herein. Alternatively, one or more of the embodiments described and/or illustrated herein may be implemented in firmware and/or hardware.

Figure 12:
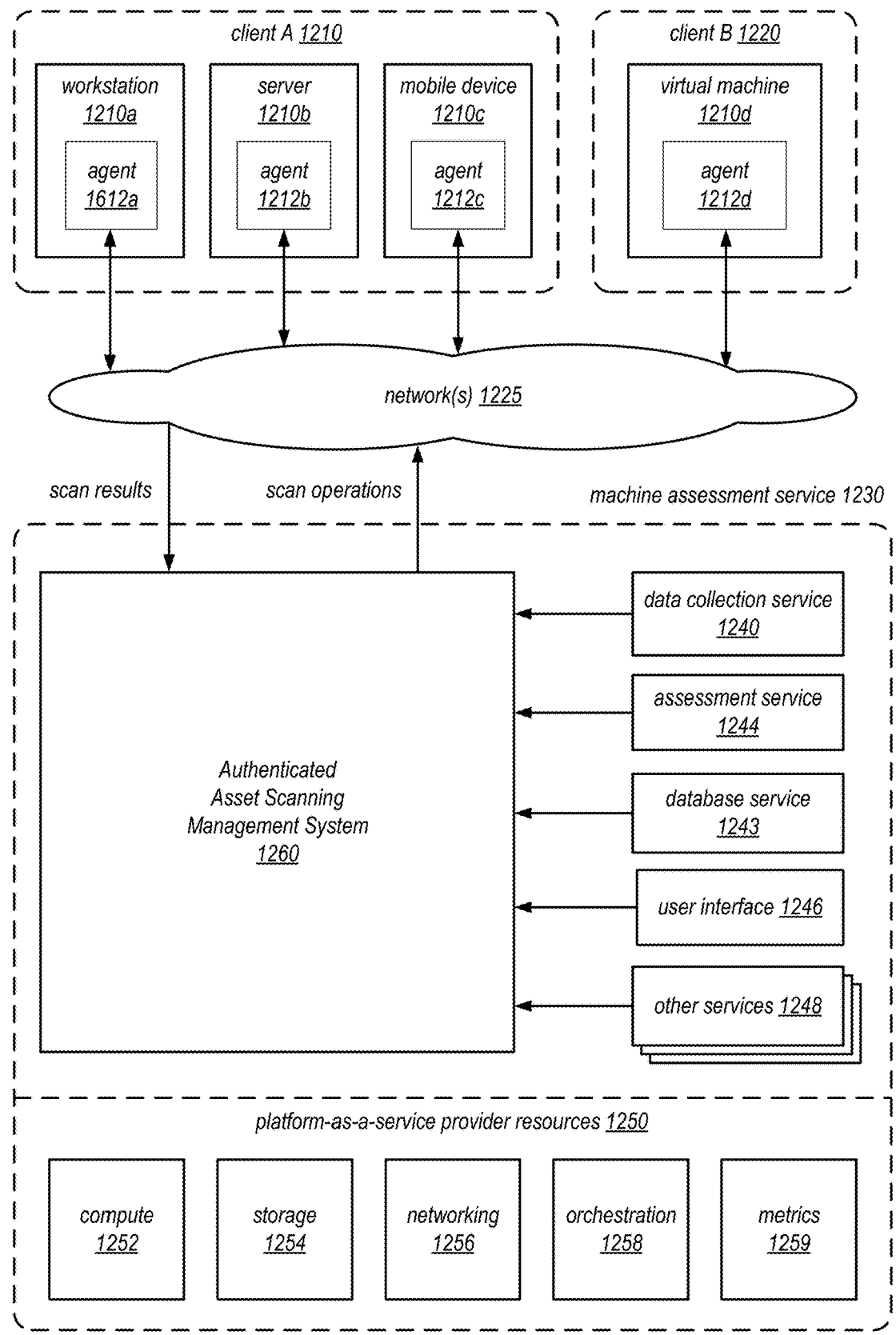
FIG. 12 is a block diagram illustrating an authenticated asset scanning management system that is implemented as part of a machine assessment service, which is in turn implemented in a platform-as-a-service provider network that contains platform-as-a-service resources, according to some aspects.

FIG. 12 is a block diagram illustrating an authenticated asset scanning management system 1260 (e.g., scan engine 120 of FIG. 1) that is implemented as part of a machine assessment service 1230, which is in turn implemented in a platform-as-a-service provider network that contains platform-as-a-service resources 1250, according to some embodiments.

As shown, the machine assessment service 1230 may be configured to interact with various agents executing on different clients 1210 and 1220 (e.g., a first client network 130a of FIG. 1, a second client network 130b of FIG. 1). The different clients may be different groups, organizations, companies, or other types of entities. In some embodiments, distinct clients 1210 and 1220 may be associated with a different user account of the machine assessment service 1230. As shown, the clients in this example may own different types of computing resources (e.g., first client asset #1 145a, first client asset #2 150a, first client asset #3 155a, second client asset #1 145b, second client asset #2 150b, second client asset #3 155b), such as a workstation 1210a, a server 1210b, a mobile device 1210c, and a virtual machine 1210d. The virtual machine 1210d may be an instance of an emulated computer that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. As another example, another type of virtualized execution environment is the container, which provides a portable and isolated execution environment over a host operating system of a physical host. Example implementations of container technologies include DOCKER, GOOGLE KUBERNETES, AMAZON WEB SERVICES, and MICROSOFT AZURE. As may be appreciated, client machines 1210 may include other types of computing systems, including embedded systems, networking devices, storage devices, Internet-of-Things (IoT) devices, vehicles, and the like.

As shown, each of these types of machines or execution environments may be monitored by agents 1212a-d (e.g., scan assistant 125 of FIG. 1) that collect machine characteristic data from the machines or execution environments. In some embodiments, the agents 1212 may be implemented as a lightweight software module on the client machines 1210. Different types of agents 1212 may be implemented for different machine platforms, such as WINDOWS, LINUX, or MAC machines. In some embodiments, the agent 1212 may be designed to run on a different computing system from the machine 1210 being monitored. In that case, the agent 1212 may be configured to establish network connections to the machine 1210 and collect machine characteristics data over these network connections.

As shown, the agents 1212 are configured to communicate with the machine assessment service 1230 over one or more networks 1225. In various embodiments, the network(s) 1225 may encompass any suitable combination of networking hardware and protocols necessary to establish communications between the agent 1212 and the machine assessment service 1230. In some embodiments, the machine 1210 may execute in a private network of a company, behind a company firewall, and the network 1225 may include a public network such as the Internet, which lies outside the firewall. The network 1225 may encompass the different telecommunications networks and service providers that collectively implement the Internet. In some embodiments, the network 1225 may also include private networks such as private local area networks (LANs), private wide area networks (WANs), or private wireless networks. The network 1225 may be implemented using different hardware (e.g., modems, routers, switches, load balancers, proxy servers, etc.) and software (e.g., protocol stacks, accounting software, firewall/security software, etc.) for establishing networking links between the client machines 1210 and the machine assessment service 1230.

As shown, the depicted system is implemented using client machines 1210a-d, and a machine assessment service 1230. In some embodiments, the depicted operations on the client machines 1210a-d may be performed by the agent 1212a-d executing on the client machine, which is configured to communicate with the machine assessment service 1230 over one or more networks 1225, to collect and report machine characteristics data about the client machines to the machine assessment service. In some embodiments, the machine assessment system 1230 may be implemented as a cloud-based or network-accessible service, which is configured to receive machine characteristics data from a large number of different client machines and perform security vulnerability assessments on remote machines based on the received data. In some embodiments, each collection agent on the client machines may be assigned a unique agent ID that identifies the agent to the machine assessment service.

As shown, the machine assessment service may include a number of services implemented on of the resources 1250 provided by the PaaS provider. As shown, the overall machine assessment system 1230 also includes an assessment service 1244, a database service 1243, and other services 1248. A data store or connection map may be hosted in the database service 1243. In some embodiments, the machine assessment service 1230 may provide the database service 1243 to store different snapshots being maintained by a collection process. The database service 1243 may be implemented on top of storage resources 1254 provided by the PaaS provider. For example, the PaaS provider may provide storage in the form of a database, a file system, or a volume hosted in the cloud. In some embodiments, the storage provided by the machine assessment service 1230 may be persistent storage. In some embodiments, the provided storage may not be guaranteed to be persistent, so that if the service is restarted, some of data may be lost. In some embodiments, the database service 1243 may be enhanced using a high-performance in-memory cache, which may be provided by the PaaS provider as a managed cluster of compute nodes, such as a REDIS cluster.

A machine assessment component may be implemented by an assessment service 1244. The assessment process may be conducted by an assessment orchestrator, which may invoke various types of assessments of the client machine. In some embodiments, the assessments may determine various security vulnerabilities of the client machine based on the collected machine characteristics. For example, an assessment may detect conditions such as the existence of malware signatures, missing application patches, incorrect or suspicious file permissions or locations, users with inappropriate access privileges, among other things. In some embodiments, the assessment service may observe and track these conditions over time, to determine a problematic or suspicious pattern of changes on the remote machine. The assessment service 1244 may then generate an assessment report that details any detected security vulnerabilities about the machine, which may be provided by the machine's owners via a user interface 1246.

As shown, the machine assessment service 1230 may also implement a user interface 1246, which may be a web-based graphical or command line user interface. The user interface 1246 can provide a data collection configuration interface, a client machine inspection interface, an assessment reporting interface, and/or an authenticated asset scanning management system interface. The client machine inspection interface may be used to examine the current state of the client machine. For example, the client machine inspection interface may allow users to navigate through the client machine's configurations and files, or issue queries against the configuration settings of the client machine. The assessment reporting interface may be used to provide results of machine assessments to users. In some embodiments, the assessment reporting interface may include a notification interface that pushes notifications to registered users, for example, via email or text, or to a client-side repository. The authenticated asset scanning management system interface can allow users to directly interact with computing resources 1210a-d by sending commands to one or more of the resources to be executed.

As shown, the machine assessment service 1230 may be implemented within a platform-as-a-service provider network, and the clients of the machine assessment service 1230 may convey service requests to and receive responses from the PaaS provider network via network 1225. In some embodiments, the service request and responses may be web services requests and responses and formatted as JSON documents. The machine assessment service 1230 may support REST-style or document-based (e.g., SOAP-based) types of web services requests. In some embodiments, the machine assessment service 1230 may implement service interfaces using other types of remote procedure calling protocols, such as GOOGLE PROTOCOL BUFFERS or PROTOBUF. The PaaS provider network may provide hardware and/or software to implement service endpoints, such that a request directed to that endpoint is properly received and processed.

As shown, the PaaS provider network may provide different types of computing resources 1250, which can be leased by service customers to implement custom hosted services. As shown, the PaaS provider may provide resource services such as compute resource service 1252, storage resource service 1254, networking resources service 1256, orchestration service 1258, and resource metrics service 1259. The services of the machine assessment service 1230 may be built using these underlying resource services provided by the PaaS provider. In some embodiments, the PaaS resources 1250 may implement features such as load balancing of incoming service requests and/or dynamic management and scaling of service node pools. In some embodiments, each of the services 1240, 1243, 1244, 1246, 1248, and the authenticated asset scanning management system 1260 may be implemented using a pool of service nodes provided by the PaaS provider, which may be individual instances of virtual machines. In some embodiments, the PaaS provider may be a provider such as AMAZON WEB SERVICES or MICROSOFT AZURE.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure.

The following clauses describe certain embodiments of systems and methods taught in the present disclosure:

Clause 1. A method comprising:
performing, by a scan assistant executing on an asset comprising at least one computing resource in a network:
authenticating a scan engine to perform scan operations on the asset to obtain a state of the asset;
establishing a secure connection with the scan engine;
receiving, from the scan engine and over the secure connection, a plurality of scan requests indicating the scan operations; and
after receipt of the scan requests, sending one or more scan responses to one or more of the scan requests over the secure connection,
wherein the scan assistant and the scan engine implement an asynchronous communication protocol that permits the scan engine to send the scan requests without waiting for scan responses for previous scan requests.

Clause 2. The method of Clause 1, further comprising the scan assistant executing at least some of the scan operations in parallel.

Clause 3. The method of Clause 1, further comprising the scan assistant sending respective scan responses to the scan requests in a same order that the scan requests were received at the scan assistant.

Clause 4. The method of Clause 1, wherein:
a particular one of the scan requests is a compound scan request that specifies a sequence of scan operations, wherein a first scan operation in the sequence generates output used by a next scan operation following the first scan operation; and
the scan response to the compound scan request indicates output of a last scan operation in the sequence but not previous scan operations before the last scan operation.

Clause 5. The method of Clause 4, wherein:
the sequence of scan operations includes:
a first scan operation to open a registry hive on the asset,
a second scan operation to open a registry key in the registry hive, and
a third scan operation to query the registry key for an associated value; and
the scan response indicates the associated value of the registry key.

Clause 6. The method of Clause 4, further comprising the scan assistant:
receiving a second compound scan request specifying a second sequence of scan operations;
detecting an error when executing a particular scan operation in the second sequence; and sending a second scan response to the second compound request that indicates the error and identifies the particular scan operation associated with the error.

Clause 7. The method of Clause 4, further comprising the scan assistant:
caching output of one or more scan operations in the sequence; and
using the cached output to respond to a subsequent compound scan request specifying the one or more scan operations in the sequence.

Clause 8. The method of Clause 1, wherein at least one of the scan operations indicates a script of commands executable on the asset Clause 9. A system comprising:
an asset comprising a computing device in a network, wherein the computing device includes memory that stores program instructions executable to implement a scan assistant on the asset, configured to:
authenticate a scan engine to perform scan operations on the asset to obtain a state of the asset;
establish a secure connection with the scan engine;
receive, from the scan engine and over the secure connection, a plurality of scan requests indicating the scan operations; and
after receipt of the scan requests, send one or more scan responses to one or more of the scan requests over the secure connection,
wherein the scan assistant and the scan engine implement an asynchronous communication protocol that permits the scan engine to send the scan requests without waiting for scan responses for previous scan requests.

Clause 10. The system of Clause 9, wherein the scan assistant is configured to execute at least some of the scan operations in parallel.

Clause 11. The system of Clause 9, wherein the scan assistant is configured to send respective scan responses to the scan requests in a same order that the scan requests were received at the scan assistant.

Clause 12. The system of Clause 9, wherein:
a particular one of the scan requests is a compound scan request that specifies a sequence of scan operations, wherein a first scan operation in the sequence generates output used by a next scan operation following the first scan operation; and
the scan response to the compound scan request indicates output of a last scan operation in the sequence but not previous scan operations before the last scan operation.

Clause 13. The system of Clause 12, wherein:
the sequence of scan operations includes:
a first scan operation to open a registry hive on the asset,
a second scan operation to open a registry key in the registry hive, and
a third scan operation to query the registry key for an associated value; and
the scan response indicates the associated value of the registry key.

Clause 14. The system of Clause 12, wherein the scan assistant is configured to:
receive a second compound scan request specifying a second sequence of scan operations;
detect an error when executing a particular scan operation in the second sequence; and
send a second scan response to the second compound request that indicates the error and identifies the particular scan operation associated with the error.

Clause 15. The system of Clause 12, wherein the scan assistant is configured to:
cache output of one or more scan operations in the sequence; and
use the cached output to respond to a subsequent compound scan request specifying the one or more scan operations in the sequence.

Clause 16. The system of Clause 9, wherein at least one of the scan operations indicates a script of commands executable on the asset Clause 17. One or more non-transitory computer-readable storage media storing program instructions that when executed on one or more processors implement a scan assistant on an asset, wherein the asset comprises a computing device in a network, and the program instructions that when executed causes the scan assistant to:
authenticate a scan engine to perform scan operations on the asset to obtain a state of the asset;
establish a secure connection with the scan engine;
receive, from the scan engine and over the secure connection, a plurality of scan requests indicating the scan operations; and
after receipt of the scan requests, send one or more scan responses to one or more of the scan requests over the secure connection,
wherein the scan assistant and the scan engine implement an asynchronous communication protocol that permits the scan engine to send the scan requests without waiting for scan responses for previous scan requests.

Clause 18. The one or more non-transitory computer-readable storage media of Clause 17, wherein the program instructions that when executed causes the scan assistant to execute at least some of the scan operations in parallel.

Clause 19. The one or more non-transitory computer-readable storage media of Clause 17, wherein the program instructions that when executed causes the scan assistant to send respective scan responses to the scan requests in a same order that the scan requests were received at the scan assistant.

Clause 20. The one or more non-transitory computer-readable storage media of Clause 17, wherein:
a particular one of the scan requests is a compound scan request that specifies a sequence of scan operations, wherein a first scan operation in the sequence generates output used by a next scan operation following the first scan operation; and
the scan response to the compound scan request indicates output of a last scan operation in the sequence but not previous scan operations before the last scan operation.

Clause 21. A method comprising:
performing, by a scan engine implemented by one or more computing devices:
performing a learning scan of an asset, wherein the asset comprises at least one computing resource, wherein the learning scan includes sending a set of scan requests to the asset as a sequence, and one or more later scan requests in the sequence is determined based on one or more scan responses to one or more earlier scan requests in the sequence;
storing, in a data store, the set of scan requests sent to the asset during the learning scan; and
performing a next scan of the asset, wherein the next scan includes sending to the asset the set of scan requests stored in the data store in a preparation phase of the next scan, and the set of scan requests are sent as a batch without individual scan requests in the batch having to wait for respective scan responses to other scan requests in the batch.

Clause 22. The method of Clause 21, wherein:

the set of scan requests are stored in the data store with an identifier of the asset; and the scan engine is configured to perform a new learning scan for a particular asset when an identifier of the particular asset is not found in the data store.

Clause 23. The method of Clause 21, wherein the sequence of scan requests sent during the learning scan includes:

(a) a first request to determine a fingerprint of an operating system used by the asset;

(b) a second request to query a configuration registry used by the operating system, to detect a software installed on the asset; and (c) a third request to obtain information about the software installed on the asset.

Clause 24. The method of Clause 21, further comprises the scan engine:

storing results obtained during the preparation phase in a data cache of the scan engine; and using contents of the data cache to perform one or more later phases of the next scan.

Clause 25. The method of Clause 21, further comprising the scan engine:

during or after the next scan, updating contents of the data store, including:

adding to the data store a new scan request that was used by the next scan; and removing from the data store an old scan request that was not used by the next scan.

Clause 26. The method of Clause 21, wherein the batch of scan requests is sent:

over a single network connection according to an asynchronous communication protocol; or in parallel over a plurality of network connections.

Clause 27. The method of Clause 21, wherein the data store stores identifiers of or pointers to metadata items obtained by the scan requests sent during the learning scan, wherein the identifiers or pointers are updated by subsequent scans of the asset based on changes to the asset or the scan engine.

Clause 28. The method of Clause 21, wherein:

the data store is a database or one or more data files; and the data store stores scan requests for different assets on a per-asset basis.

Clause 29. The method of Clause 28, wherein the data store is implemented at a centralized location accessible by a plurality of scan engines.

Clause 30. The method of Clause 28, further comprising:

generating, using contents of the data store, a baseline of scan requests used to scan new assets that have not been previously scanned.

Clause 31. A system comprising:

a scan engine implemented by one or more computing devices, configured to:

perform a learning scan of an asset, wherein the asset comprises at least one computing resource, wherein the learning scan includes sending a set of scan requests to the asset as a sequence, and one or more later scan requests in the sequence is determined based on one or more scan responses to one or more earlier scan requests in the sequence;

store, in a data store, the set of scan requests sent to the asset during the learning scan; and perform a next scan of the asset, wherein the next scan includes sending to the asset the set of scan requests stored in the data store in a preparation phase of the next scan, and the set of scan requests are sent as a batch without individual scan requests in the batch having to wait for respective scan responses to other scan requests in the batch.

Clause 32. The system of Clause 31, wherein:

the set of scan requests are stored in the data store with an identifier of the asset; and the scan engine is configured to perform a new learning scan for a particular asset when an identifier of the particular asset is not found in the data store.

Clause 33. The system of Clause 31, wherein the sequence of scan requests sent during the learning scan includes:

(a) a first request to determine a fingerprint of an operating system used by the asset;

(b) further requests to determine fingerprints of different types of software installed on the asset; and (c) additional requests to obtain information about the different types of software installed on the asset.

Clause 34. The system of Clause 31, wherein the scan engine is configured to: store results obtained during the preparation phase in a data cache of the scan engine; and use contents of the data cache to perform one or more later phases of the next scan.

Clause 35. The system of claim Clause 31, wherein the scan engine is configured to: during or after the next scan, update contents of the data store to:

add to the data store a new scan request that was used by the next scan; and remove from the data store an old scan request that was not used by the next scan.

Clause 36. The system of Clause 31, wherein the data store stores identifiers of or pointers to metadata items obtained by the scan requests sent during the learning scan, wherein the identifiers or pointers are updated by subsequent scans of the asset based on changes to the asset or the scan engine.

Clause 37. The system of Clause 31, wherein:

the data store is a database or one or more data files; and the data store stores scan requests for different assets on a per-asset basis.

Clause 38. The system of Clause 37, wherein the data store is implemented at a centralized location accessible by a plurality of scan engines.

Clause 39. The system of Clause 37, wherein the scan engine is configured to:

generate, using contents of the data store, a baseline of scan requests used to scan new assets that have not been previously scanned.

Clause 40. One or more non-transitory computer readable media storing program instructions that when executed on one or more processors cause the one or more processors to implement a scan engine configured to:

perform a learning scan of an asset, wherein the asset comprises at least one computing resource, wherein the learning scan includes sending a set of scan requests to the asset as a sequence, and one or more later scan requests in the sequence is determined based on one or more scan responses to one or more earlier scan requests in the sequence;

store, in a data store, the set of scan requests sent to the asset during the learning scan;

and perform a next scan of the asset, wherein the next scan includes sending to the asset the set of scan requests stored in the data store in a preparation phase of the next scan, and the set of scan requests are sent as a batch without individual scan requests in the batch having to wait for respective scan responses to other scan requests in the batch.

What is claimed is:

1. A method comprising:
performing, by a scan assistant executing on an asset comprising at least one computing resource in a network:
authenticating a scan engine to perform scan operations on the asset to obtain a state of the asset;
establishing a secure connection with the scan engine;
receiving, from the scan engine and over the secure connection, a plurality of scan requests indicating the scan operations, wherein a particular one of the scan requests is a compound scan request that specifies a sequence of scan operations, wherein a first scan operation in the sequence generates output used by a next scan operation following the first scan operation; and
after receipt of the scan requests, sending one or more scan responses to one or more of the scan requests over the secure connection, wherein a particular scan response to the compound scan request indicates output of a last scan operation in the sequence but not previous scan operations before the last scan operation,
wherein the scan assistant and the scan engine implement an asynchronous communication protocol that permits the scan engine to send the scan requests without waiting for scan responses for previous scan requests.

2. The method of claim 1, further comprising the scan assistant executing at least some of the scan operations in parallel.

3. The method of claim 1, further comprising the scan assistant sending respective scan responses to the scan requests in a same order that the scan requests were received at the scan assistant.

4. The method of claim 1, wherein:
the sequence of scan operations includes:
a first scan operation to determine a fingerprint of an operating system used by the asset; and
additional operations to determine fingerprints of different software installed on the asset.

5. The method of claim 1, wherein:
the sequence of scan operations includes:
a first scan operation to open a registry hive on the asset,
a second scan operation to open a registry key in the registry hive, and
a third scan operation to query the registry key for an associated value; and
the particular scan response indicates the associated value of the registry key.

6. The method of claim 1, further comprising the scan assistant:
receiving a second compound scan request specifying a second sequence of scan operations;
detecting an error when executing a particular scan operation in the second sequence; and
sending a second scan response to the second compound request that indicates the error and identifies the particular scan operation associated with the error.

7. The method of claim 1, further comprising the scan assistant:
caching output of one or more scan operations in the sequence; and
using the cached output to respond to a subsequent compound scan request specifying the one or more scan operations in the sequence.

8. The method of claim 1, wherein at least one of the scan operations indicates a script of commands executable on the asset.

9. A system comprising:
an asset comprising a computing device in a network, wherein the computing device includes memory that stores program instructions executable to implement a scan assistant on the asset, configured to:
authenticate a scan engine to perform scan operations on the asset to obtain a state of the asset;
establish a secure connection with the scan engine;
receive, from the scan engine and over the secure connection, a plurality of scan requests indicating the scan operations, wherein a particular one of the scan requests is a compound scan request that specifies a sequence of scan operations, wherein a first scan operation in the sequence generates output used by a next scan operation following the first scan operation; and
after receipt of the scan requests, send one or more scan responses to one or more of the scan requests over the secure connection, wherein a particular scan response to the compound scan request indicates output of a last scan operation in the sequence but not previous scan operations before the last scan operation,
wherein the scan assistant and the scan engine implement an asynchronous communication protocol that permits the scan engine to send the scan requests without waiting for scan responses for previous scan requests.

10. The system of claim 9, wherein the scan assistant is configured to execute at least some of the scan operations in parallel.

11. The system of claim 9, wherein the scan assistant is configured to send respective scan responses to the scan requests in a same order that the scan requests were received at the scan assistant.

12. The system of claim 9, wherein:
the sequence of scan operations includes:
a first scan operation to determine a fingerprint of an operating system used by the asset; and
additional operations to determine fingerprints of different software installed on the asset.

13. The system of claim 9, wherein:
the sequence of scan operations includes:
a first scan operation to open a registry hive on the asset,
a second scan operation to open a registry key in the registry hive, and
a third scan operation to query the registry key for an associated value; and
the particular scan response indicates the associated value of the registry key.

14. The system of claim 9, wherein the scan assistant is configured to:
receive a second compound scan request specifying a second sequence of scan operations;
detect an error when executing a particular scan operation in the second sequence; and
send a second scan response to the second compound request that indicates the error and identifies the particular scan operation associated with the error.

15. The system of claim 9, wherein the scan assistant is configured to:
cache output of one or more scan operations in the sequence; and
use the cached output to respond to a subsequent compound scan request specifying the one or more scan operations in the sequence.

16. The system of claim 9, wherein at least one of the scan operations indicates a script of commands executable on the asset.

17. One or more non-transitory computer-readable storage media storing program instructions that when executed on one or more processors implement a scan assistant on an asset, wherein the asset comprises a computing device in a network, and the program instructions that when executed causes the scan assistant to:
authenticate a scan engine to perform scan operations on the asset to obtain a state of the asset;
establish a secure connection with the scan engine;
receive, from the scan engine and over the secure connection, a plurality of scan requests indicating the scan operations, wherein a particular one of the scan requests is a compound scan request that specifies a sequence of scan operations, wherein a first scan operation in the sequence generates output used by a next scan operation following the first scan operation; and
after receipt of the scan requests, send one or more scan responses to one or more of the scan requests over the secure connection, wherein a particular scan response to the compound scan request indicates output of a last scan operation in the sequence but not previous scan operations before the last scan operation,
wherein the scan assistant and the scan engine implement an asynchronous communication protocol that permits the scan engine to send the scan requests without waiting for scan responses for previous scan requests.

18. The one or more non-transitory computer-readable storage media of claim 17, wherein the program instructions that when executed causes the scan assistant to execute at least some of the scan operations in parallel.

19. The one or more non-transitory computer-readable storage media of claim 17, wherein the program instructions that when executed causes the scan assistant to send respective scan responses to the scan requests in a same order that the scan requests were received at the scan assistant.

20. The one or more non-transitory computer-readable storage media of claim 17, wherein:
the sequence of scan operations includes:
a first scan operation to determine a fingerprint of an operating system used by the asset; and
additional operations to determine fingerprints of different software installed on the asset.

\* \* \* \* \*